US012671930B2

(12) United States Patent
Suzuki et al.

(10) Patent No.: US 12,671,930 B2
(45) Date of Patent: Jun. 30, 2026

(54) TELEPHONIC COMMUNICATION DEVICE

(71) Applicant: Panasonic System Networks R&D Lab. Co., Ltd., Miyagi (JP)

(72) Inventors: Shinya Suzuki, Miyagi (JP); Takeshi Tambo, Ishikawa (JP)

(73) Assignee: PANASONIC SYSTEM NETWORKS R&D LAB. CO., LTD., Miyagi (JP)

( * ) Notice: Subject to any disclaimer, the term of this patent is extended or adjusted under 35 U.S.C. 154(b) by 141 days.

(21) Appl. No.: 18/849,270

(22) PCT Filed: Jan. 26, 2023

(86) PCT No.: PCT/JP2023/002486
§ 371 (c)(1),
(2) Date: Sep. 20, 2024

(87) PCT Pub. No.: WO2023/181626
PCT Pub. Date: Sep. 28, 2023

(65) Prior Publication Data
US 2025/0203263 A1      Jun. 19, 2025

(30) Foreign Application Priority Data

Mar. 24, 2022    (JP) ................................. 2022-048628
Oct. 27, 2022    (JP) ................................. 2022-172702

(51) Int. Cl.
*H04R 1/10*          (2026.01)
*H04B 13/00*        (2006.01)

(52) U.S. Cl.
CPC ......... *H04R 1/1016* (2013.01); *H04B 13/005* (2013.01); *H04R 1/1083* (2013.01)

(58) Field of Classification Search
CPC ...... H04B 13/005; H04B 1/1016; H04B 1/10; H04B 1/1075; H04B 1/02; H04B 1/1083; H04B 2201/107; H04B 2460/13
See application file for complete search history.

(56) References Cited

U.S. PATENT DOCUMENTS 5,295,193 A  *  3/1994  Ono ..................... H04R 1/1016
                                                            381/322
9,451,357 B2    9/2016  Fukuda
                    (Continued)

FOREIGN PATENT DOCUMENTS

JP          05-115092        5/1993
JP          2583838          2/1997
                    (Continued)

OTHER PUBLICATIONS

International Search Report issued in International Pat. Appl. No. PCT/JP2023/002486, dated Mar. 14, 2023, along with an English translation thereof.

*Primary Examiner* — Sunita Joshi
(74) *Attorney, Agent, or Firm* — Greenblum & Bernstein, P.L.C.

(57)                ABSTRACT

Provided is a telephonic communication device that achieves a stable contact between a bone conduction microphone and a vocal cord vibration transmission part of an ear and prevents generation of abnormal noise by a user's action and prevents the microphone from picking up such noise. The device includes a bone conduction microphone for picking up a user's utterance, an air conduction receiver for reproducing a communication partner's voice, a housing having an opening facing the user's tragus, and a tip rubber (first elastic member) and microphone rubber (second elastic member) attached to the housing. The tip rubber abuts against an ear canal wall opposite the tragus. The microphone rubber is elastically supported by a peripheral edge of the opening while holding the bone conduction microphone, and includes a protruding portion protruding from the opening and having an abutting surface that abuts against a surface on or around the tragus.

9 Claims, 19 Drawing Sheets

(56) References Cited

U.S. PATENT DOCUMENTS

2003/0165248 A1* 9/2003 Lenz ................... H04R 25/656
381/328
2014/0348346 A1* 11/2014 Fukuda ............... H04R 25/606
381/151

FOREIGN PATENT DOCUMENTS

JP          2001-326985      11/2001
WO          2013/118539       8/2013

* cited by examiner

TELEPHONIC COMMUNICATION DEVICE

TECHNICAL FIELD

The present disclosure relates to a telephonic communication device comprising a microphone and receiver and configured to be worn on a user's head, and in particular, a telephonic communication device comprising a housing that houses and contains a bone conduction microphone and an air conduction receiver therein, and is adapted to be inserted into a user's ear.

BACKGROUND ART

Telephonic communication devices, each equipped with a microphone and receiver and configured to be worn on a user's head, have become widely used. Moreover, proposed devices in recent years include a telephonic communication device comprising a housing that houses and contains a bone conduction microphone and an air conduction receiver therein and is configured to be inserted into a user's ear.

Known telephonic communication devices of such type include a device comprising a fitting member containing an air conduction receiver therein and a bone conduction microphone supported by the fitting member with an elastic member therebetween, wherein the fitting member is formed to fit into a space in the fossa navicularis of a user's ear, and the bone conduction microphone is pressed against an ear canal wall by a deformation force of the elastic member (Patent Document 1).

Another known device comprises a housing made of a rigid synthetic plastic material and configured to house and contain a bone conduction microphone and an air conduction receiver therein, wherein the housing is shaped complementary to a user's ear canal to enable the housing to be tightly fitted into the ear canal, thereby enabling an outer surface of the housing that contains the bone conduction microphone to be attached closely to an ear canal wall (Patent Document 2).

PRIOR ART DOCUMENT(S)

Patent Document(s)

Patent Document 1: JP2583838B2
Patent Document 2: JPH05-115092A

SUMMARY OF THE INVENTION

Task to be Accomplished by the Invention

In the prior-art technology disclosed in Patent Document 1, a stable state of contact between the bone conduction microphone and an ear canal wall enables the bone conduction microphone to collect sound of a user's utterances from the ear canal wall. In order to achieve such a stable contact, it is required that the fitting member is properly fitted into a space in the fossa navicularis of a user's ear. However, due to individual differences in the shape of a space in the fossa navicularis, it often happens that the fitting member fails to be fitted into a space of fossa navicularis of a user. This causes a problem of forming a large gap between the fitting member and the space in the fossa navicularis, which causes a failure to achieve a stable state of contact between the bone conduction microphone and the ear canal wall. Another problem of the prior art device is that the inability to ensure airtightness of the air conduction receiver results in poor acoustic performance. Yet another problem is that, when the fitting member is too large for a space of a user's fossa navicularis, the device is simply unable to be fitted into the user's ear.

In the prior art technology disclosed in Patent Document 2, the rigid housing shaped complementary to a user's ear canal stabilizes a state of contact between the bone conduction microphone and an ear canal wall. However, when the shape of an ear canal changes in response to a user's action such as utterance, a rigid housing of the device of Patent Document 2 is unable to properly follow the change in shape of the ear canal, thereby causing the undesired change in the state of contact between the bone conduction microphone and the ear canal wall.

Furthermore, in Patent Document 2, the bone conduction microphone is directly to the housing, which causes a problem that the change in the state of contact between the housing and the ear canal wall results in generation of abnormal noise, and the bone conduction microphone unavoidably picks up such abnormal noise.

The present disclosure has been made in view of the problems of the prior art, and a primary object of the present disclosure is to provide a telephonic communication device that achieves a stable contact between a bone conduction microphone and a vocal cord vibration transmission part of a user's ear irrespective of individual difference in shape of the ear and prevents generation of abnormal noise by the user's action (e.g. user's utterance), and also prevents the microphone from picking up such abnormal noise.

Means to Accomplish the Task

An aspect of the present disclosure provides a telephonic communication device comprising: a bone conduction microphone that picks up a user's utterance; an air conduction receiver that reproduces a received voice of a partner that is a person at another end of communication; a housing that houses the bone conduction microphone and the air conduction receiver; and first and second elastic members attached to the housing, wherein the housing has an opening facing the user's tragus, wherein the first elastic member is formed to abut against at least an ear canal wall opposite the tragus, wherein the second elastic member is elastically supported by a peripheral edge of the opening while holding the bone conduction microphone, and wherein the second elastic member includes a protruding portion that protrudes from the opening, the protruding portion having an abutting surface that abuts against a surface on or around the tragus.

Effect of the Invention

According to the present disclosure, the bone conduction microphone is elastically supported by the housing with the second elastic member provided therebetween, which ensures a secure and stable contact between the bone conduction microphone and a vocal cord vibration transmission part of a user's ear irrespective of individual difference in shape of the ear. In addition, the bone conduction microphone abuts against the vocal cord vibration transmission part via the second elastic member, which prevents generation of abnormal noise by the user's action (e.g. user's utterance), and also prevents the microphone from picking up such abnormal noise.

BRIEF DESCRIPTION OF THE DRAWINGS

FIG. 14(A) shows the telephonic communication device in use and FIG. 14(B) shows a contact area;

FIG. 18(A) shows the telephonic communication device in use and FIG. 18(B) shows a contact area.

Figure 1:
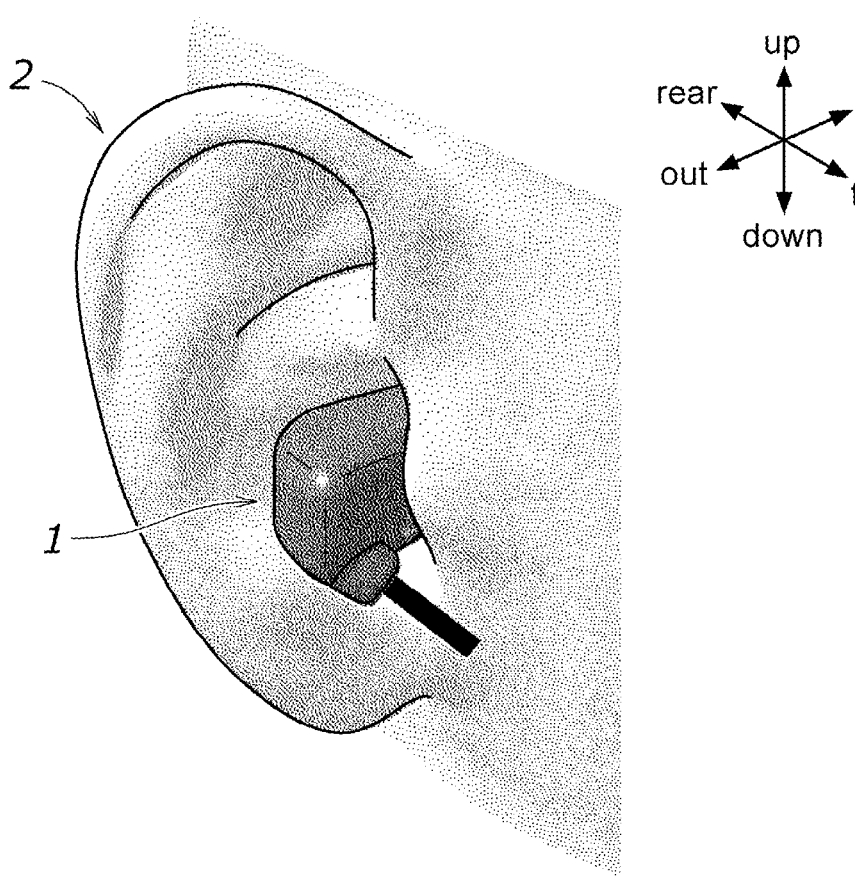
FIG. 1 is a perspective view of a telephonic communication device according to a first embodiment of the present disclosure, the telephonic communication being in use.
Figure 1:
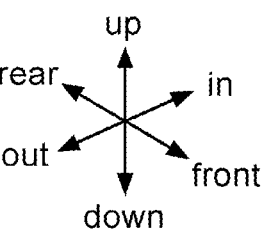

DESCRIPTION OF THE PREFERRED EMBODIMENT(S).

A first aspect of the present disclosure made to achieve the above-described object is a telephonic communication device comprising: a bone conduction microphone that picks up a user's utterance; an air conduction receiver that reproduces a received voice of a partner that is a person at another end of communication; a housing that houses the bone conduction microphone and the air conduction receiver; and first and second elastic members attached to the housing, wherein the housing has an opening facing the user's tragus, wherein the first elastic member is formed to abut against at least an ear canal wall opposite the tragus, wherein the second elastic member is elastically supported by a peripheral edge of the opening while holding the bone conduction microphone, and wherein the second elastic member includes a protruding portion that protrudes from the opening, the protruding portion having an abutting surface that abuts against a surface on or around the tragus.

According to this configuration, the bone conduction microphone is elastically supported by the housing with the second elastic member provided therebetween, which ensures a secure and stable contact between the bone conduction microphone and a vocal cord vibration transmission part (tragus) of a user's ear irrespective of individual difference in shape of the ear. In addition, the bone conduction microphone abuts against the vocal cord vibration transmission part via the second elastic member, which prevents generation of abnormal noise by the user's action (e.g. user's utterance), and also prevents the microphone from picking up such abnormal noise.

A second aspect of the present disclosure is the telephonic communication device of the first aspect, wherein the second elastic member includes a microphone receiving portion in a shape of a pouch that receives and surrounds the bone conduction microphone, and wherein the microphone receiving portion includes a wall portion on which the abutting surface is formed.

This configuration enables the second elastic member to elastically and stably hold the bone conduction microphone.

A third aspect of the present disclosure is the telephonic communication device of the first aspect, wherein the second elastic member includes a flange circumferentially extending on an outer side surface thereof, and the flange is fixedly mounted onto the peripheral edge of the opening.

In this configuration, the bone conduction microphone is elastically supported by the housing with the flexible and thin flange of the second elastic member therebetween. Thus, when a user's voice, i.e., vocal cord vibration is transmitted from the abutting surface of the second elastic member to the bone conduction microphone, the second elastic member is prevented from excessively inhibiting surface vibration of the bone conduction microphone, allowing the bone conduction microphone to properly collect sound of utterances of the user.

A fourth aspect of the present disclosure is the telephonic communication device of the first aspect, wherein the housing has a passageway portion for directing reproduced sound from the air conduction receiver, wherein the air conduction receiver is disposed at one end of the passageway portion, and wherein the first elastic member is disposed at the other end of the passageway portion and has a through hole for further directing the reproduced sound that travels through the passageway portion to inside the ear canal.

In this configuration, reproduced sound from the air conduction receiver is properly directed to the ear canal.

A fifth aspect of the present disclosure is the telephonic communication device of the first aspect, wherein the abutting surface of the second elastic member is formed in either a curved bulging shape or a flat shape.

This configuration enables the telephonic communication device to be properly fitted to the shape of a user's ear canal, and enables the user to have a feel of wearing the device that is preferable for the user.

A sixth aspect of the present disclosure is the telephonic communication device of the first aspect, wherein the abutting surface of the second elastic member is formed in one of an upward slope shape toward inside the ear canal, a flat shape, or a downward slope shape toward inside the ear canal.

This configuration enables the telephonic communication device to be properly fitted to the shape of a user's ear canal, and enables the user to have a feel of wearing the device that is preferable for the user.

A seventh aspect of the present disclosure is the telephonic communication device of the first aspect, wherein the first elastic member is formed in either a solid or hollow structure. This configuration enables the telephonic communication device to be properly fitted to the shape of a user's ear canal, and enables the user to have a feel of wearing the device that is preferable for the user.

An eighth aspect of the present disclosure is the telephonic communication device of the first aspect, further comprising a third elastic member provided between the housing and a surface of the second elastic member opposite the abutting surface thereof.

In this configuration, even when the second elastic member is suddenly and significantly deformed, the third elastic member reduces possible vibration that would be caused when the second elastic member strikes the housing, thereby preventing the bone conduction microphone from picking up abnormal noise.

A ninth aspect of the present disclosure is the telephonic communication device of the first aspect, wherein the first elastic member is integrally formed with the second elastic member.

This configuration reduces the number of parts of the device.

Embodiments of the present disclosure will be described below with reference to the drawings.

First Embodiment

Figure 2:
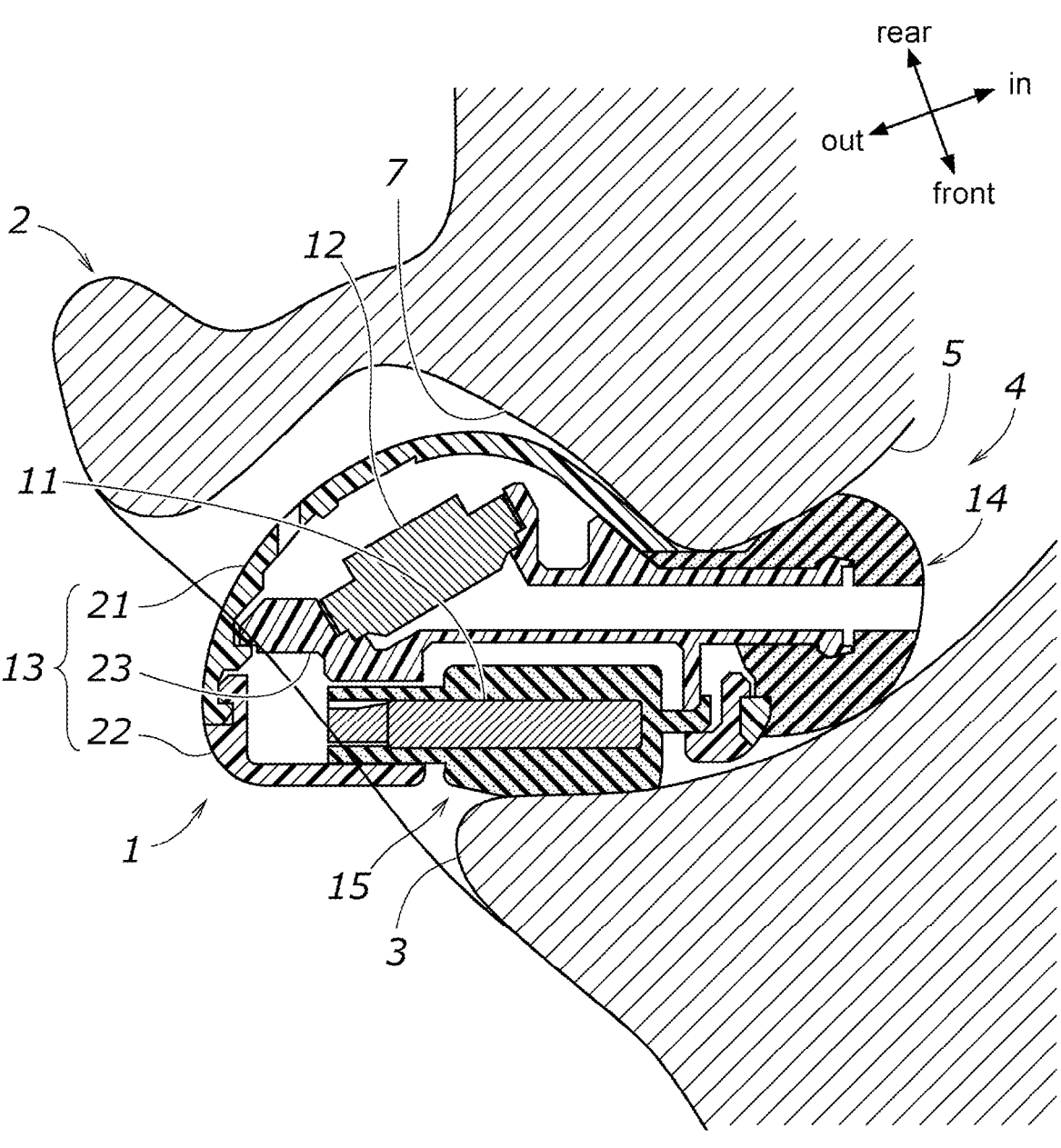
FIG. 2 is a cross-sectional view of the telephonic communication device in use.
Figure 3:
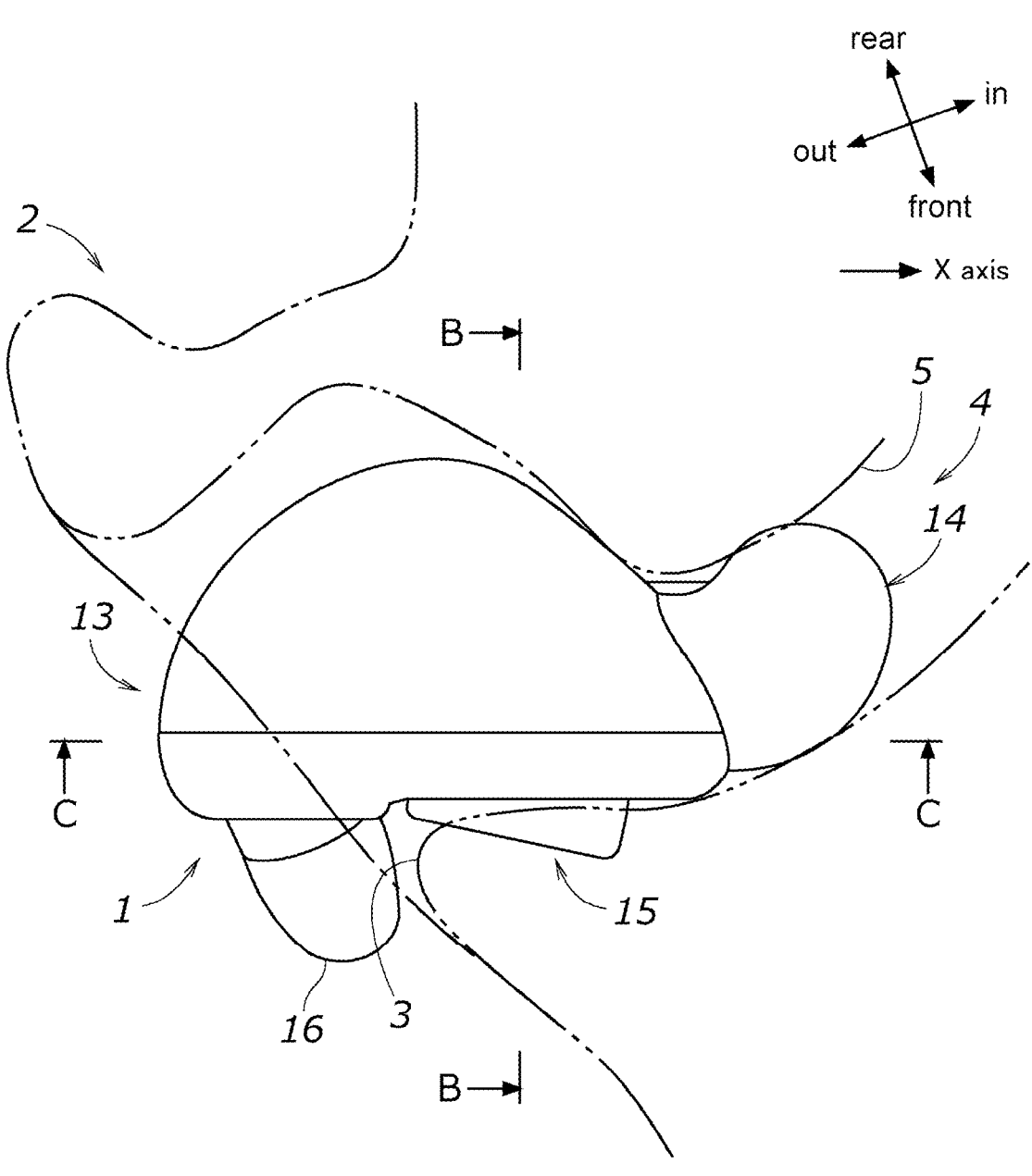
FIG. 3 is a plan view of the telephonic communication device.
Figure 4:
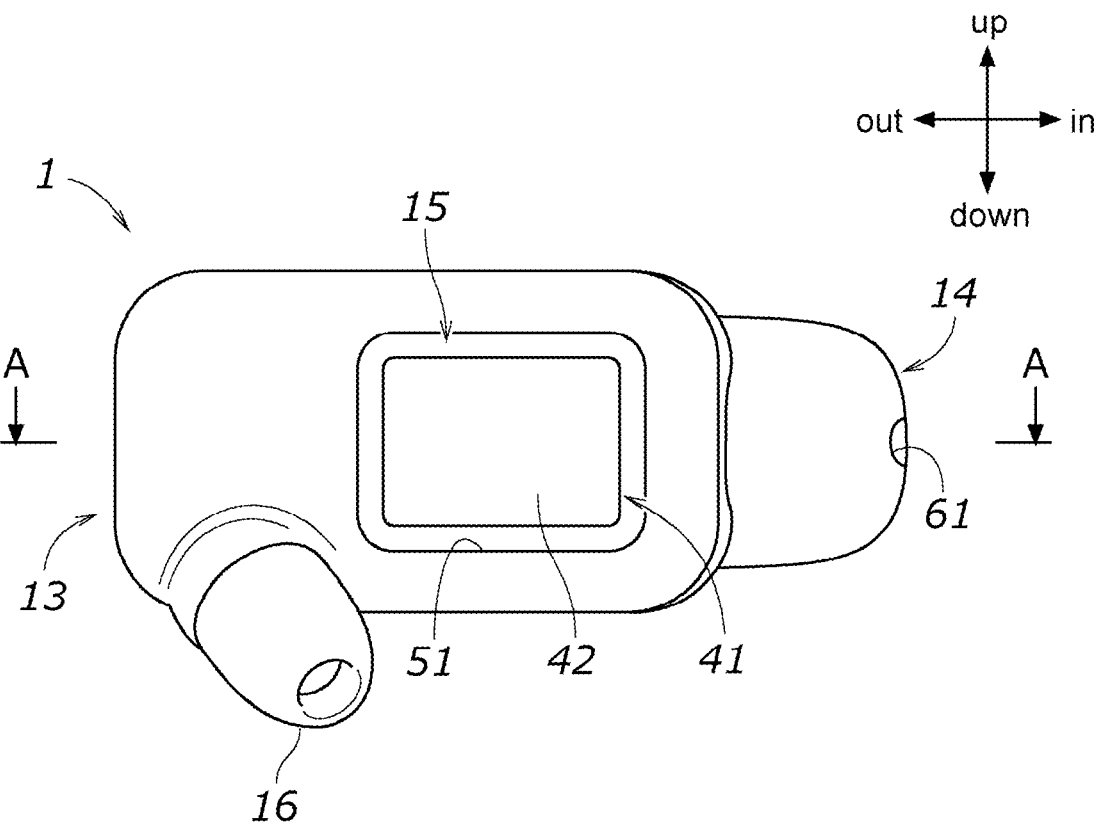
FIG. 4 is a side view of the telephonic communication device.
Figure 5:
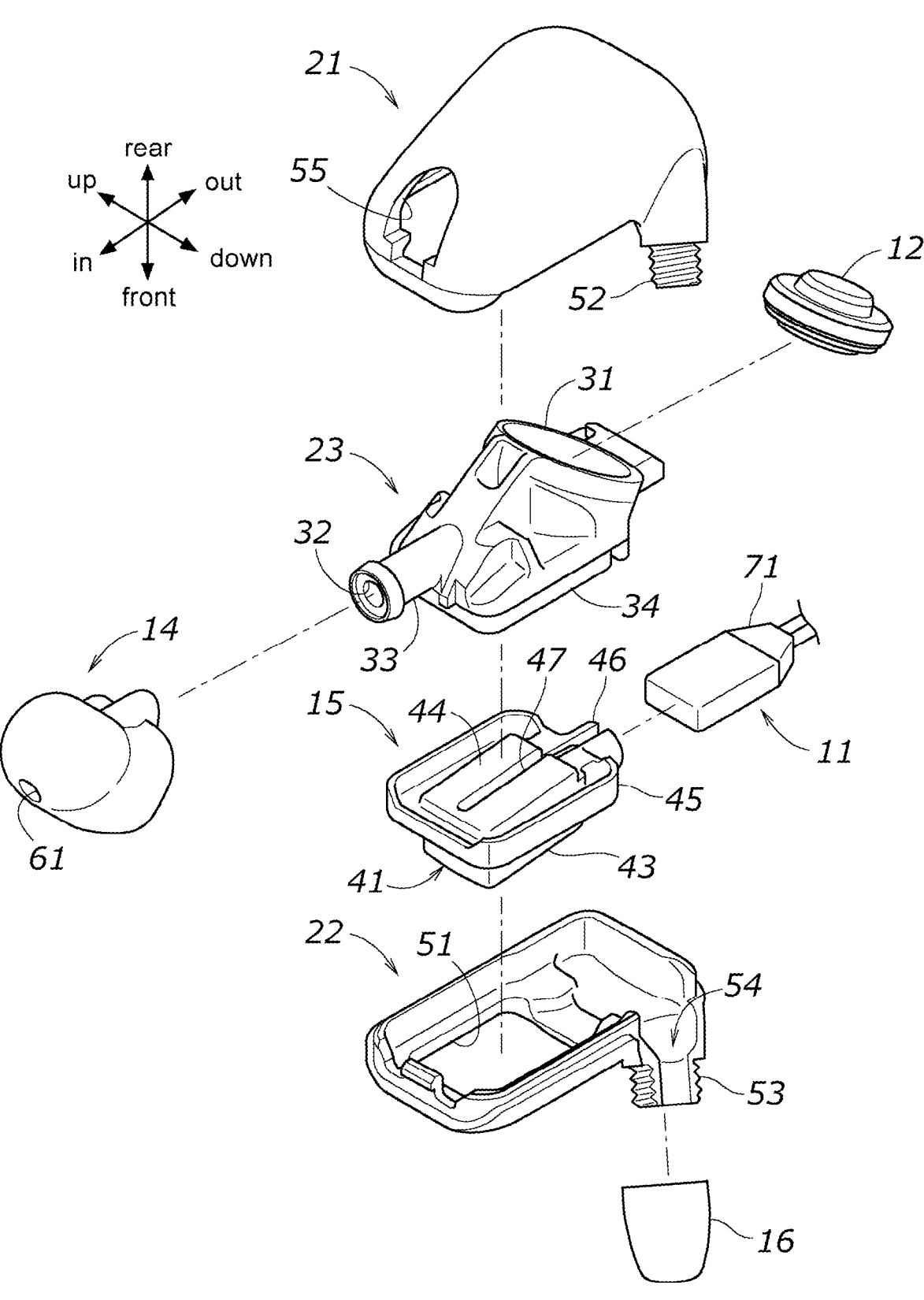
FIG. 5 is an exploded perspective view of the telephonic communication device.
Figure 6:
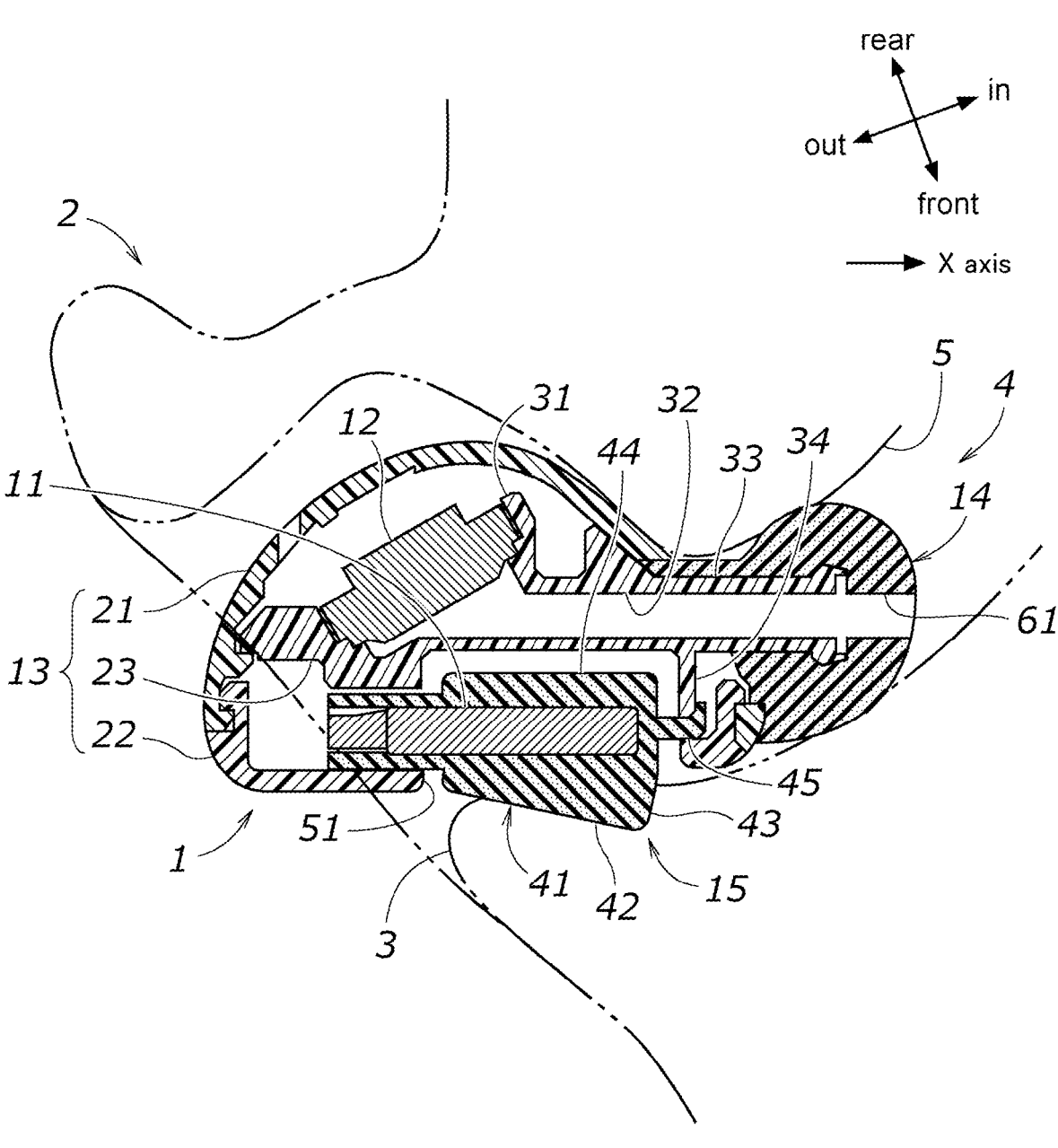
FIG. 6 is a cross-sectional view of the telephonic communication device taken along line A-A shown in FIG. 4.
Figure 7:
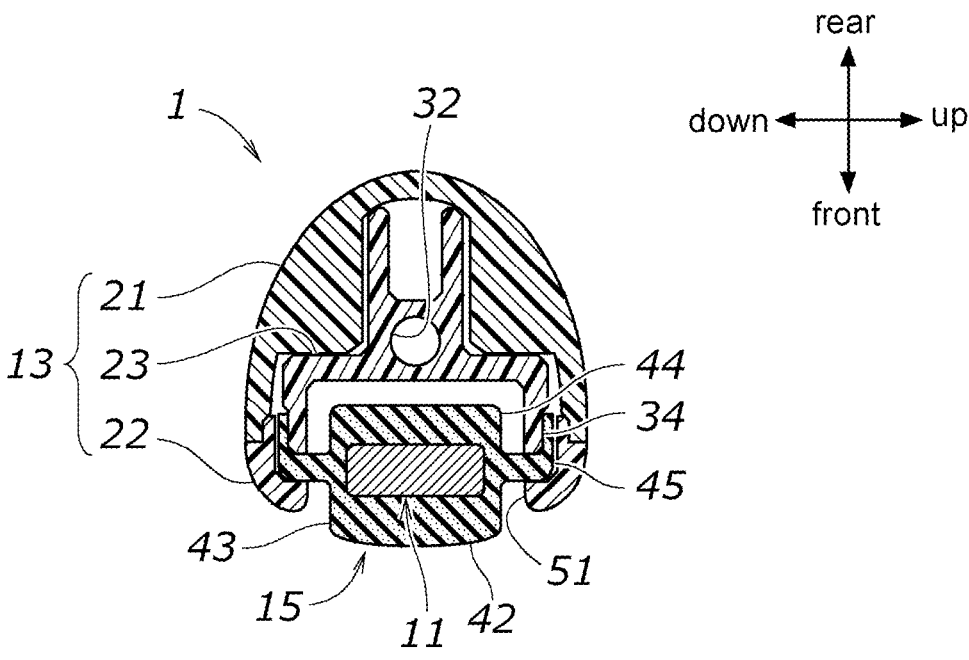
FIG. 7 is a cross-sectional view of the telephonic communication device taken along line B-B shown in FIG. 3.
Figure 8:
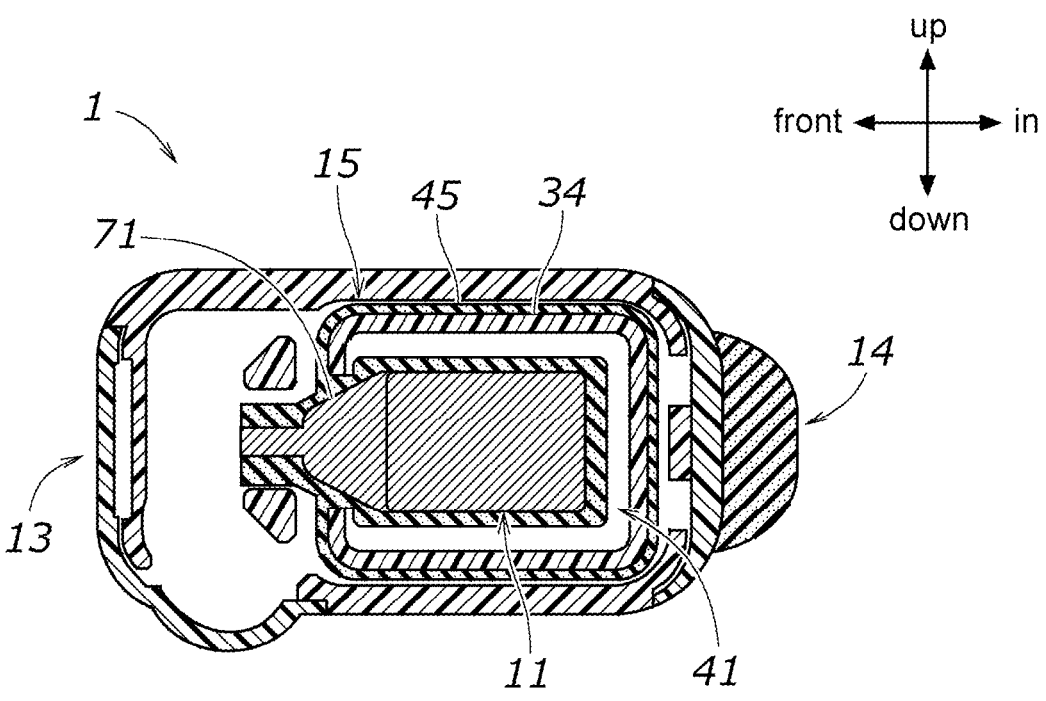
FIG. 8 is a cross-sectional view of the telephonic communication device taken along line C-C shown in FIG. 3.

FIG. 1 is a perspective view of a telephonic communication device according to a first embodiment of the present disclosure, the telephonic communication being in use. FIG. 2 is a cross-sectional view of the telephonic communication device in use. FIG. 3 is a plan view of the telephonic communication device. FIG. 4 is a side view of the telephonic communication device. FIG. 5 is an exploded perspective view of the telephonic communication device. FIG. 6 is a cross-sectional view of the telephonic communication device taken along line A-A shown in FIG. 4. FIG. 7 is a cross-sectional view of the telephonic communication device taken along line B-B shown in FIG. 3. FIG. 8 is a cross-sectional view of the telephonic communication device taken along line C-C shown in FIG. 3.

As shown in FIGS. 1 and 2, the telephonic communication device 1 is adapted to be inserted into an ear 2 of a user. In the present embodiment, the telephonic communication device 1 is inserted into the user's right ear 2. However, the telephonic communication device 1 may also be inserted into the user's left ear, and in this case, the telephonic communication device 1 appears symmetrical to the one shown in the drawings.

As shown in FIG. 6, the telephonic communication device 1 includes a bone conduction microphone 11, an air conduction receiver 12, a housing 13, a tip rubber 14, which is a member made of an elastic material such as rubber (first elastic member), and a microphone rubber 15, which is a member made of an elastic material such as rubber (second elastic member).

The bone conduction microphone 11 includes a vibration detecting element for collecting voice of user. The bone conduction microphone 11 abuts against a tragus 3 of a user with the microphone rubber 15 provided therebetween, and the user's tragus 3 is used as a vocal cord vibration transmission part, where the user's vocal cord vibration is transmitted. The bone conduction microphone 11 collects the user's utterances that are transmitted as vocal cord vibrations from the user's tragus 3.

The air conduction receiver 12 is comprised of, for example, a dynamic driver. The air conduction receiver 12 reproduces a received voice of a communication partner (person at another end of communication). The sound reproduced by the air conduction receiver 12 is not limited to the voice of the communication partner, and may include, for example, ambient sound and on-hold tone.

The housing 13 includes a case 21 and cover 22 (parts of an outer housing), and a chassis 23 (inner housing). The case 21 and cover 22 form a main body that houses the bone conduction microphone 11 and the air conduction receiver 12.

The chassis 23 includes a receiver holding portion 31 configured to hold the air conduction receiver 12. The chassis 23 also includes a passageway portion 32 that directs the sound reproduced by the air conduction receiver 12 to an ear canal 4 of a user. The passageway portion 32 extends in a longitudinal direction of the telephonic communication device. The air conduction receiver 12 is placed at one end (outer end) of the passageway portion 32, and the tip rubber 14 is placed at the other end (inner end) of the passageway portion 32. The chassis 23 has a tubular portion 33 as a part thereof. As shown in FIG. 5, the tubular portion 33 is inserted into an opening 55 formed in the case 21 and protrudes outward. The tip rubber 14 is attached to the tubular portion 33.

The microphone rubber 15 elastically holds the bone conduction microphone 11. Specifically, the microphone rubber 15 includes a microphone receiving portion 41 formed in a shape of a pouch that receives and surrounds the bone conduction microphone 11. The microphone receiving portion 41 includes a first wall portion 43 having an abutting surface 42 that abuts against the user's tragus 3, and a second wall portion 44 opposite the first wall portion 43 with the bone conduction microphone 11 therebetween. The microphone rubber 15 may be made of silicone rubber, for example.

The cover 22 has an opening 51 facing the user's tragus 3 (FIG. 5). The microphone receiving portion 41 of the microphone rubber 15 fits into the opening 51 to protrude from the opening 51. The abutting surface 42 of the first wall portion 43 is formed in the outer surface thereof such that the abutting surface 42 protrudes from the opening 51 and abuts against the user's tragus 3.

The tip rubber 14 is shaped to be complementary to the user's ear canal 4. Specifically, the tip rubber 14 is formed to protrude along a first curve of the ear canal 4, which allows the tip rubber 14 to be in contact with the user's ear canal 4 over the entire periphery, thereby ensuring airtightness of the air conduction receiver 12 to enhance acoustic performance. The tip rubber 14 has a through hole 61 at the center position to direct the sound reproduced by the air conduction receiver 12 to the ear canal 4. The tip rubber 14 may be made of silicone rubber, for example.

As shown in FIG. 5, the microphone rubber 15 is provided with a flange 45 circumferentially extending on an outer side surface of the microphone receiving portion 41. The flange 45 is disposed between the cover 22 and the chassis 23 of the housing 13 to be secured to the housing 13. Specifically, the chassis 23 has a protrusion 34. As shown in FIG. 7, the flange 45 of the microphone rubber 15 is disposed between the protrusion 34 of the chassis 23 and the peripheral edge of the opening 51 in the cover 22. The flange 45 has an L-shape in cross-section and extends to an outer circumference of the protrusion 34. As shown in FIG. 8, the flange 45 and the protrusion 34 extend along the entire circumference of the bone conduction microphone 11, except for a location for a conductor terminal 71.

The conductor terminal 71 of the bone conduction microphone 11 includes litz wires extending from the bone conduction microphone 11 and is reinforced with a bonding material. Furthermore, as shown in FIG. 5, the microphone rubber 15 has a tubular portion 46 that holds the conductor terminal 71 of the bone conduction microphone 11. The tubular portion 46 enables the bone conduction microphone 11 to be elastically held by the microphone rubber 15 together with the conductor terminal 71.

Thus, in the present embodiment, the bone conduction microphone 11 is elastically supported by the microphone rubber 15. More specifically, the flexible and thin flange 45 of the microphone rubber 15 is secured to the housing 13. In this configuration, when the abutting surface 42 of the microphone rubber 15 abuts against a user's tragus 3, and vocal cord vibration is transmitted from the abutting surface 42 to the bone conduction microphone 11, the microphone rubber 15 is prevented from excessively inhibiting surface vibration of the bone conduction microphone 11, allowing the bone conduction microphone 11 to properly collect sound of utterances of the user.

Moreover, in the present embodiment, the microphone rubber 15 holding the bone conduction microphone 11 generally abuts against the vocal cord vibration transmission part of a user's ear, which avoids direct contact between the housing 13 and an ear canal wall around the bone conduction microphone 11. In addition, even when the housing 13 contacts the ear canal wall to cause abnormal noise, the microphone rubber 15 dampens the abnormal noise that passes therethrough, preventing the bone conduction microphone 11 from collecting such abnormal noise. Even when the ear canal 4 changes in shape in response to the user's action such as utterance, the microphone rubber 15 elastically deforms to properly follow the change in the shape of the ear canal 4, thereby preventing generation of abnormal noise, which further prevents the bone conduction microphone 11 from picking up abnormal noise.

When a user uses the telephonic communication device 1, the user grasps and gently pushes the telephonic communication device 1 into the ear hole, allowing the telephonic communication device 1 to be inserted into the ear canal. As a result, the abutting surface 42 of the microphone rubber 15 abuts against the tragus 3 of the user, while the tip rubber 14 abuts against an ear canal wall 5 opposite the tragus 3. When the telephonic communication device is inserted into the ear canal, the microphone rubber 15 is pressed against the user's tragus 3, which causes the microphone rubber 15 to deform elastically, and the force generated by the elastic deformation of the microphone rubber 15 causes the microphone rubber 15 to abut against the tragus 3 with a relatively high pressure. The tip rubber 14 comes into contact with the user's ear canal 4 over the entire periphery. In particular, a portion of the tip rubber 14 which contacts a rear ear canal wall 5, abuts against the ear canal wall 5 with a relatively high pressure due to the reaction force generated when the microphone rubber 15 is pressed to the user's tragus 3. This allows the bone conduction microphone 11 to remain in contact with the user's tragus 3 via the microphone rubber 15 in a stable and secure manner.

In other embodiments, the tip rubber 14 is not shaped to be complementary to the user's ear canal 4, and abuts against only the rear ear canal wall 5 opposite the tragus 3, not a front ear canal wall 5. This configuration spoils s airtightness of the air conduction receiver 12, but allows generation of proper reaction force to press the microphone rubber 15 against the user's tragus 3.

The microphone rubber 15 defines a slit 47 extending from the second wall portion 44 of the microphone receiving portion 41, which is formed in a shape of a pouch for receiving and surrounding the bone conduction microphone 11, to the tubular portion 46. When the microphone receiving portion 41 is deformed to open (widen) the slit 47, the bone conduction microphone 11 can be accommodated in the microphone receiving portion 41.

The case 21 and cover 22 have their threaded portions 52, 53, and a cable cap 16 is threadably attached and fitted to each of the threaded portions. Each of the threaded portions 52, 53 has a cable insertion hole 54 for insertion of a cable that is formed with litz wires extending out of the bone conduction microphone 11.

Next, microphone rubbers of the present embodiment and variations thereof will be described. FIGS. 9(A) to 9(F) are perspective views of microphone rubbers according to the present embodiment and variations thereof. FIGS. 10(A) and 10(B) are cross-sectional views of the telephonic communication device including microphone rubbers of variations of the present embodiment.

The microphone rubber 15 includes a microphone receiving portion 41 formed in a shape of a pouch that receives and surrounds the bone conduction microphone 11. The microphone receiving portion 41 includes the abutting surface 42 that abuts against the user's tragus 3. The abutting surface 42 is shaped to conform to the tragus 3 so that the abutting surface 42 properly abuts against the tragus 3 with sufficient pressure. The abutting surface 42 may have any of various shapes as described in the following description, in which the X axis corresponds to the vertical direction of the telephonic communication device 1 in use, and the Y axis corresponds to the in-out direction of the telephonic communication device 1 in use.

Figure 9:
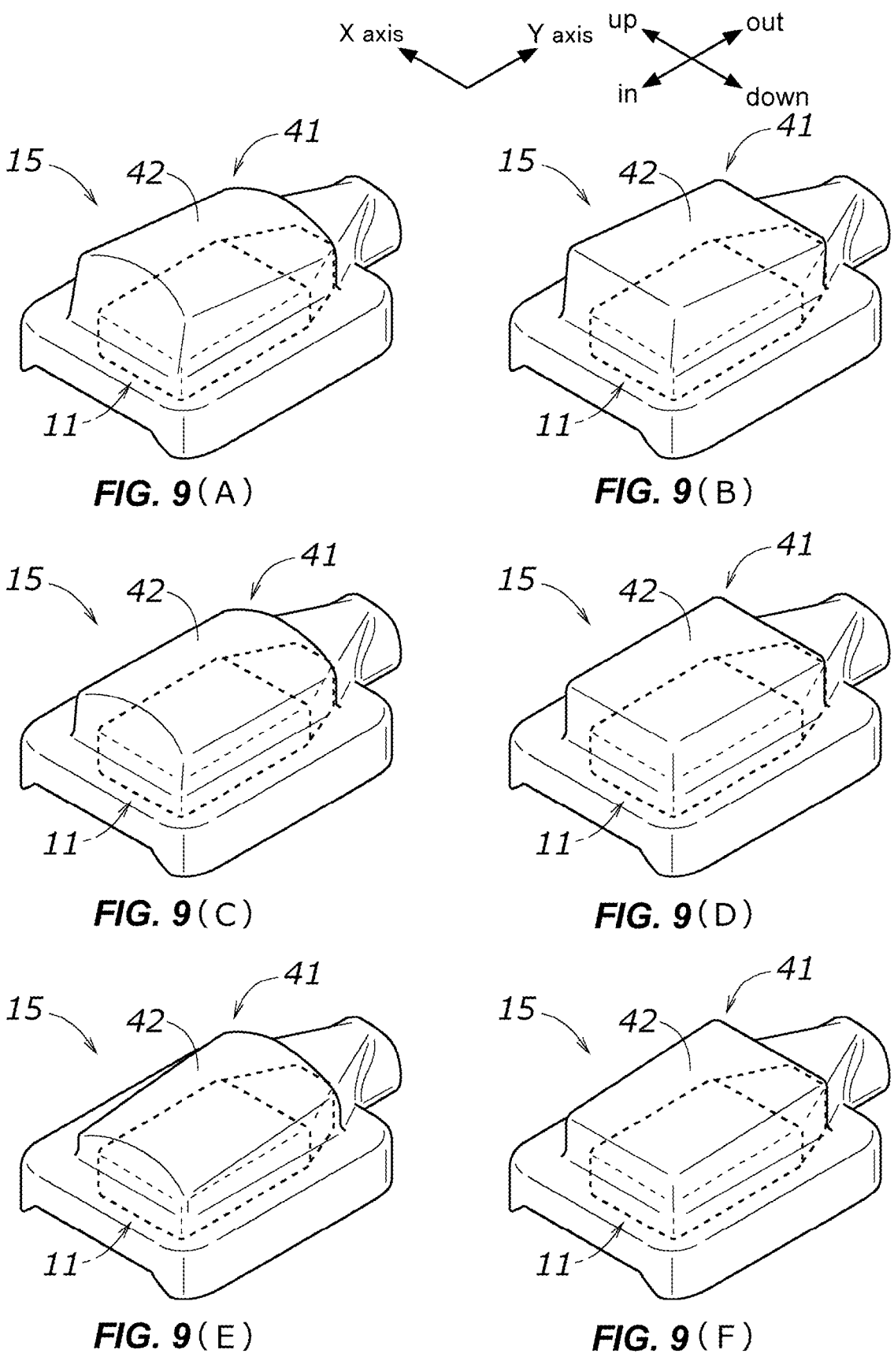
FIGS. 9(A) to 9(F) show perspective views of microphone rubbers of the first embodiment and variations thereof.
Figures 10A, 10B:
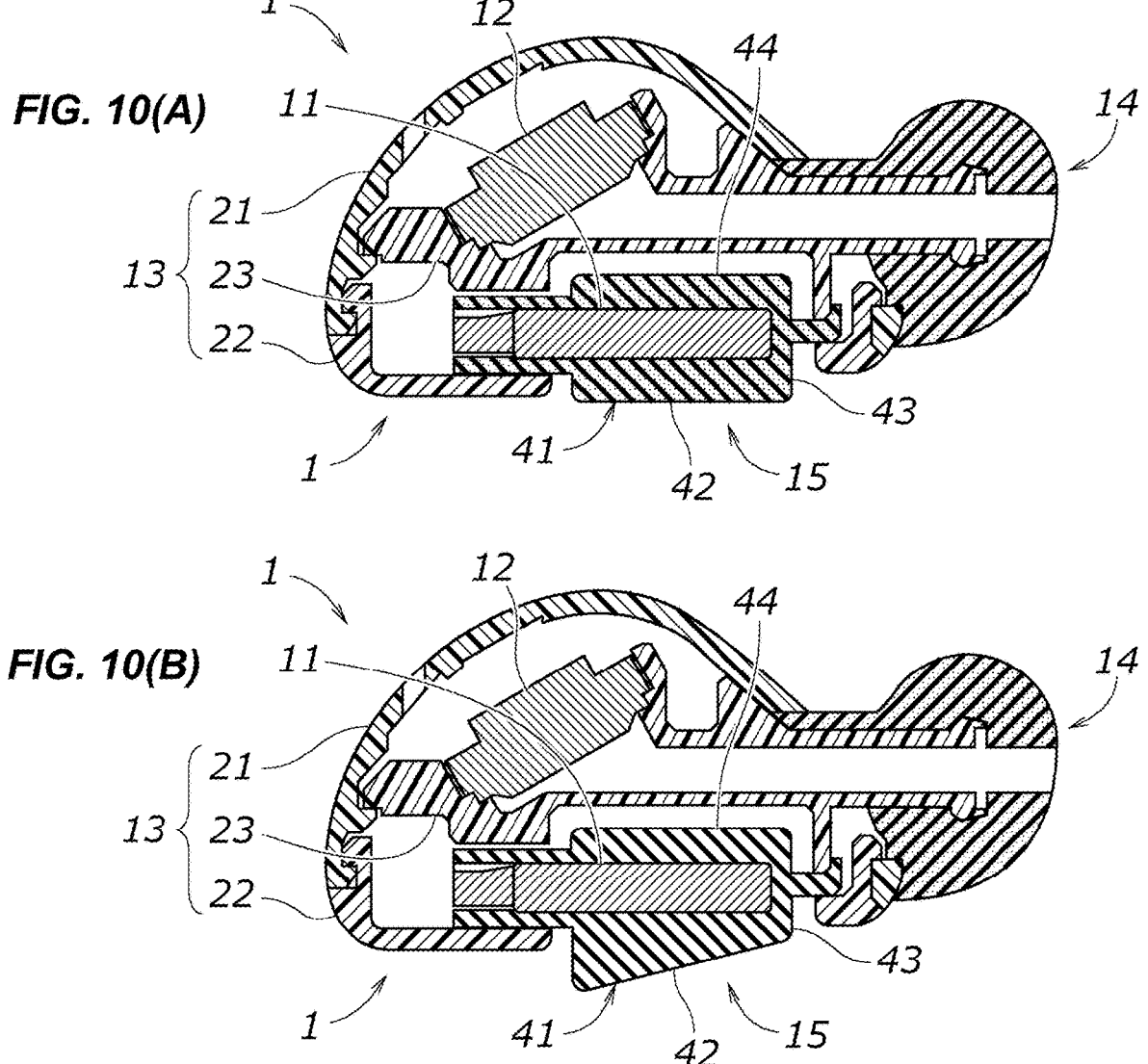
FIGS. 10(A) and 10(B) show cross-sectional views of the telephonic communication device including microphone rubbers of variations of the first embodiment.

With respect to the cross-sectional shape of the abutting surface 42 of the microphone rubber 15 along the X-axis direction, in the present embodiment, as shown in FIG. 9(A), the abutting surface 42 of the microphone rubber 15 has a curved bulging shape, i.e., an arc-shape with a higher center in cross-section along the X-axis direction.

In the variations shown in FIGS. 9(C) and 9(D), the abutting surface 42 of the microphone rubber 15 also has a curved bulging shape, i.e., an arc-shape with a higher center in cross section along the X-axis direction, in a similar manner to the present embodiment.

In the variations shown in FIGS. 9(B), 9(D), and 9(F), the abutting surface 42 of the microphone rubber 15 has a flat shape, i.e., a straight shape in cross section along the X-axis direction.

With respect to the cross-sectional shape of the abutting surface 42 of the microphone rubber 15 along the Y-axis direction, in the present embodiment, as shown in FIG. 9(A), the abutting surface 42 of the microphone rubber 15 has an upward slope shape that gradually becomes higher toward the inside (toward inside the ear canal) (See FIG. 6).

In the variation shown in FIG. 9(B), the abutting surface 42 of the microphone rubber 15 also has a flat shape, an upward slope shape that gradually becomes higher toward the inside.

In the variations shown in FIGS. 9(C) and 9(D), the abutting surface 42 of the microphone rubber 15 has a flat shape, i.e., a straight shape in cross section along the Y-axis direction (see FIG. 10(A)).

In the variation shown in FIGS. 9(E) and 9(F), the abutting surface 42 of the microphone rubber 15 also has a flat shape, a downward slope shape that gradually becomes lower toward the inside (see FIG. 10(B)).

As shown in FIGS. 6, 10(A), and 10(B), the position of the bone conduction microphone 11 held by the microphone rubber 15 does not change with the change in the shape of the abutting surface 42 of the microphone rubber 15. Specifically, when the abutting surface 42 of the microphone rubber 15 has an inclined shape (upward slope shape or downward slope shape) in cross section along the Y-axis direction, the thickness of the first wall portion 43 (of the microphone receiving portion 41) on the side of the abutting surface 42 gradually increases or decreases from one end in the Y-axis direction to the other end.

Figure 11:
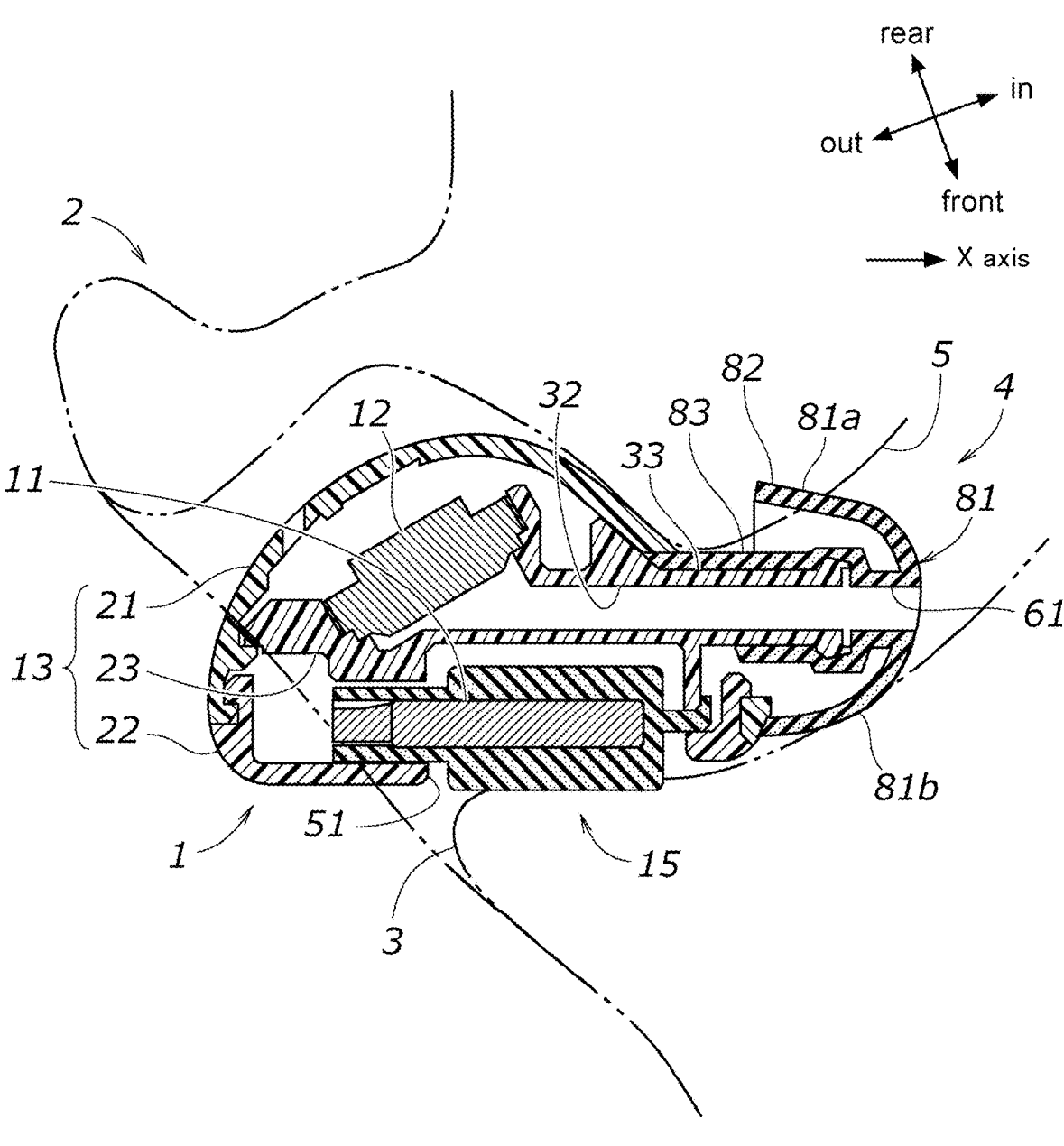
FIG. 11 is a cross-sectional view of the telephonic communication device including a tip rubber of a variation of the first embodiment.

Next, a tip rubber of a variation of the first embodiment will be described. FIG. 11 is a cross-sectional view of the telephonic communication device including a tip rubber of the variation of the first embodiment.

In the embodiment shown in FIG. 6, the tip rubber 14 has a solid structure. In the variation of the first embodiment, a tip rubber 81 has a hollow structure (a hollowed-out structure). More specifically, the tip rubber 81 has a hollow structure that opens on the side of the housing 13.

The tip rubber 81 includes an outer surface portion 82 and a tubular attachment portion 83. The outer surface portion 82 has a similar outer surface shape to the tip rubber 14 shown in FIG. 6. The tubular attachment portion 83 is fitted into the tubular portion 33 of the housing 13 and has a through hole 61 that directs the reproduced sound from the air conduction receiver 12 to the user's ear canal 4.

In the embodiment shown in FIG. 11, the tip rubber 81 has a rear portion 81A and a front portion 81B both of which have a hollow structure. In other embodiments, the tip rubber 81 may be configured such that one of the rear portion 81A and the front portion 81B has a hollow structure and the other has a solid structure.

Figure 12:
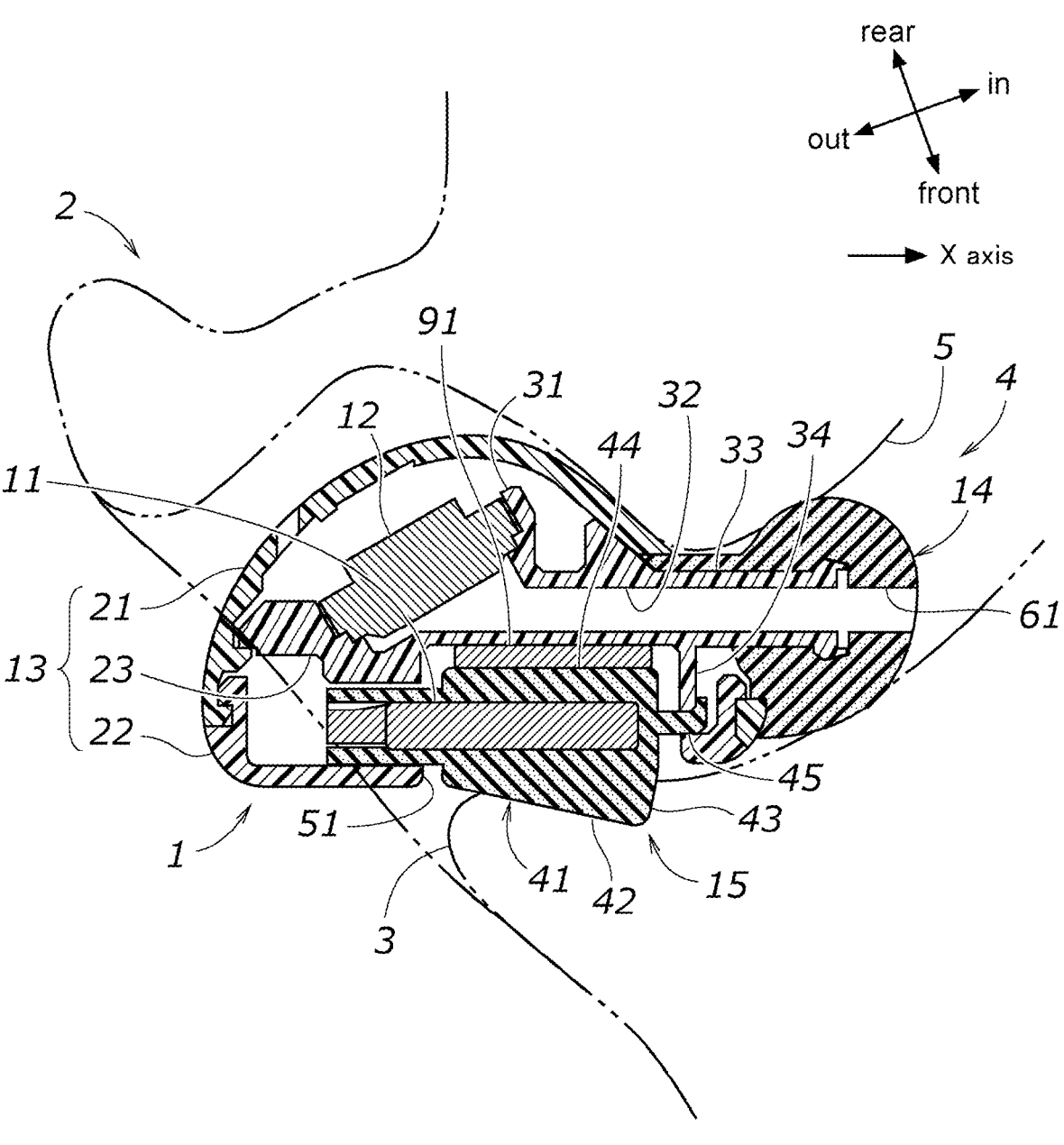
FIG. 12 is a cross-sectional view of the telephonic communication device further including an interposed rubber of a variation of the first embodiment.

Next, the telephonic communication device further including an interposed rubber of a variation of the first embodiment with be described. FIG. 12 is a cross-sectional view of the telephonic communication device further including the interposed rubber.

In the embodiment shown in FIG. 6, the microphone rubber 15 is supported by the cover 22 and the chassis 23 only at the periphery of the microphone rubber 15, and a gap is formed between the microphone rubber 15 and the chassis 23. In this variation of the embodiment, in addition to the cover 22 and the chassis 23 supporting the periphery of the microphone rubber 15, an interposed rubber 91, which is a member made of an elastic material such as rubber (third elastic member), is provided between the microphone rubber 15 and the chassis 23.

The interposed rubber 91 is provided between the chassis 23 and the second wall portion 44 of the microphone receiving portion 41 of the microphone rubber 15, opposite the abutting surface 42 that abuts against the user's tragus 3, with the bone conduction microphone 11 between the second wall portion 44 and the abutting surface 42. The interposed rubber 91 is secured to either the microphone rubber 15 or the chassis 23. In other cases, the interposed rubber 91 may be secured to both the microphone rubber 15 and the chassis 23. The interposed rubber 91 is made of, for example, of a polyurethane elastomer. The interposed rubber 91 may be made of a different material from the microphone rubber 15 or the same material as the microphone rubber 15.

In the configuration in which a gap is formed between the microphone rubber 15 and the chassis 23 as in the embodi-ment shown in FIG. 6, when the microphone rubber 15 is suddenly and significantly deformed, the microphone rubber 15 can strike the chassis 23 to generate abnormal noise, and cause the bone conduction microphone 11 to pick up the generated abnormal noise. In this variation of the embodi-ment, the interposed rubber 91 provided between the micro-phone rubber 15 and the chassis 23 reduces possible abnor-mal noise that can be picked up by the bone conduction microphone 11. Furthermore, the interposed rubber 91 can provide vibration damping to dampen unwanted vibrations of the microphone rubber 15 and vibration isolation to reduce unwanted vibrations of the microphone rubber 15.

Second Embodiment

Figure 13:
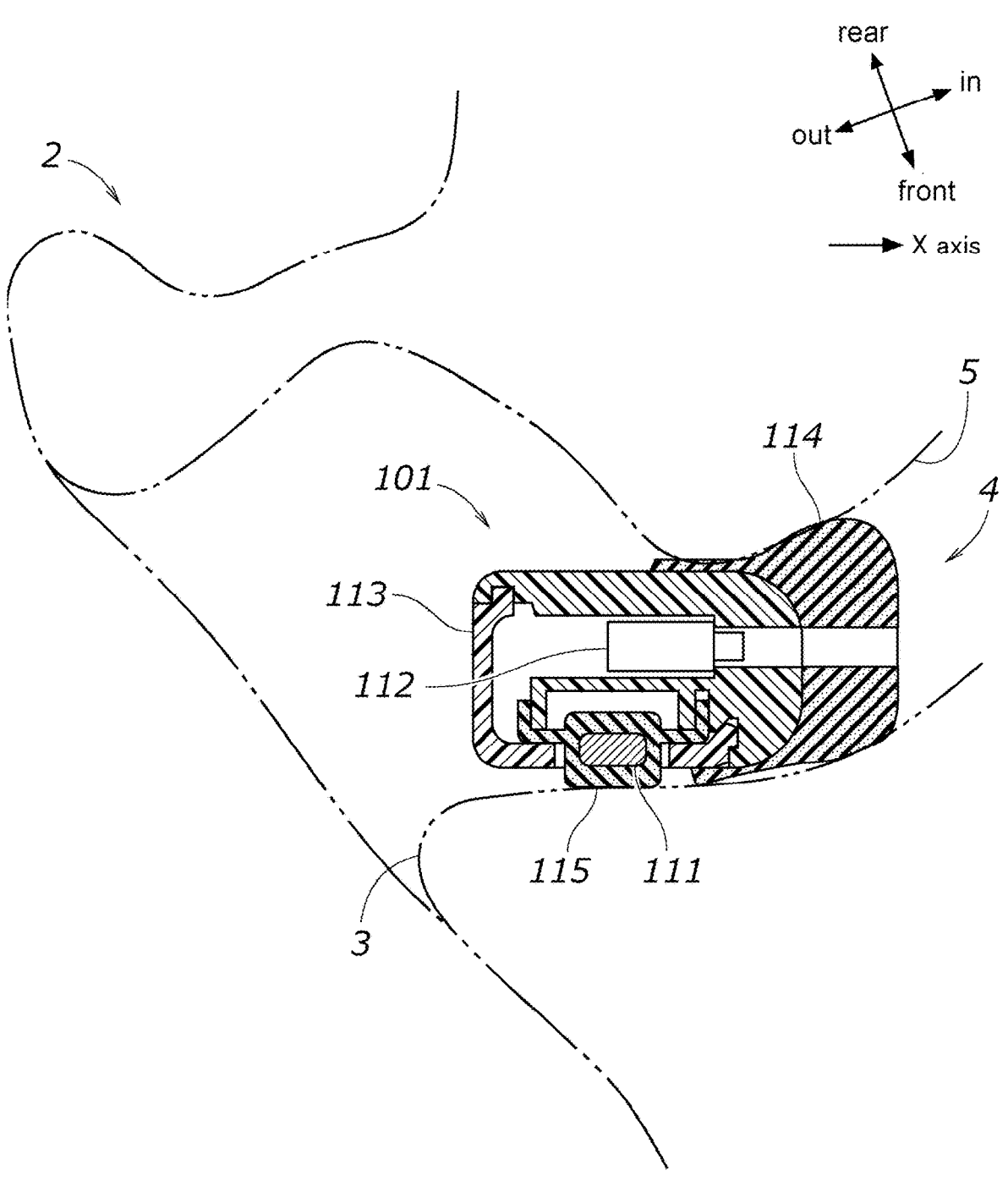
FIG. 13 is a cross-sectional view of a telephonic communication device according to a second embodiment of the present disclosure.

Next, a second embodiment of the present disclosure will be described. Except for what will be discussed here, the second embodiment is the same as the above-described first embodiment. FIG. 13 is a cross-sectional view of a tel-ephonic communication device 101 according to the second embodiment of the present disclosure.

The telephonic communication device 101 includes a bone conduction microphone 111, an air conduction receiver 112, a housing 113, a tip rubber 114 (first elastic member), and a microphone rubber 115 (second elastic member). The bone conduction microphone 111 is housed and elastically supported by the microphone rubber 115 in the same manner as the first embodiment. However, in the second embodi-ment, the air conduction receiver 112 is comprised of, for example, a balanced armature driver. This feature allows the telephonic communication device 101 to be made smaller.

Third Embodiment

Figure 14A:
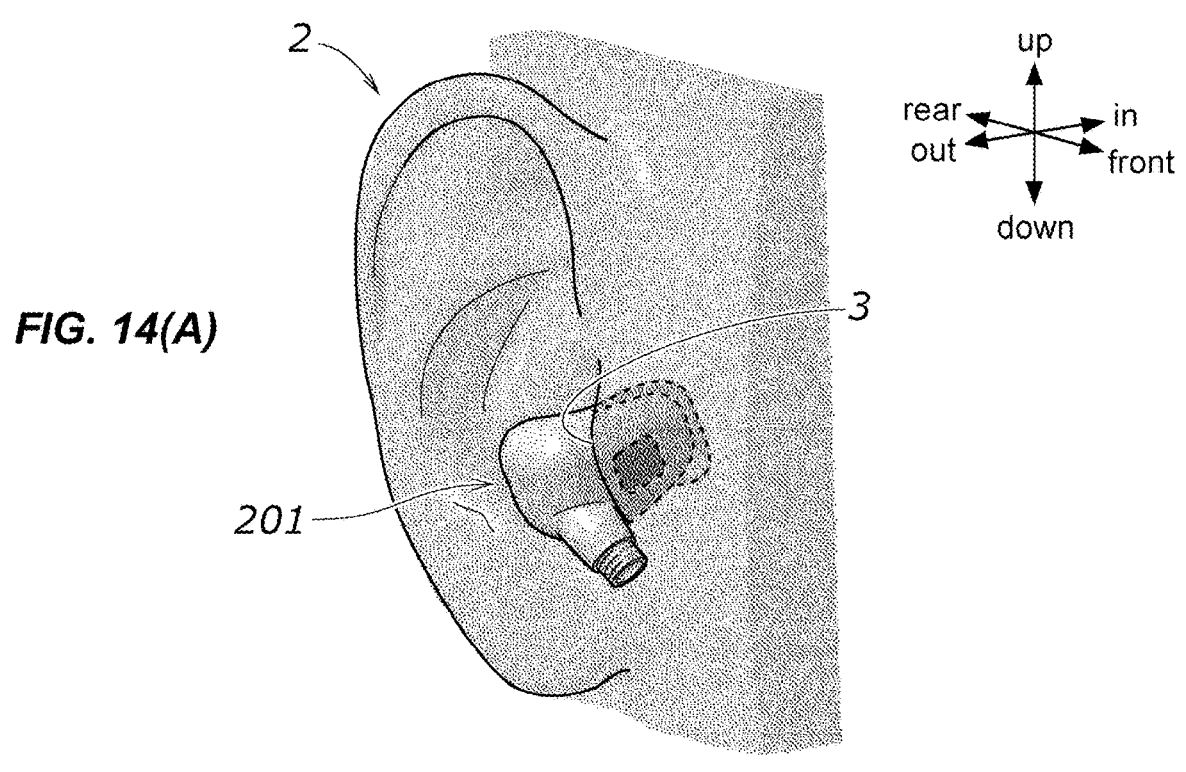
FIGS. 14(A) and 14(B) show perspective views of a telephonic communication device according to a third embodiment of the present disclosure.
Figure 14B:
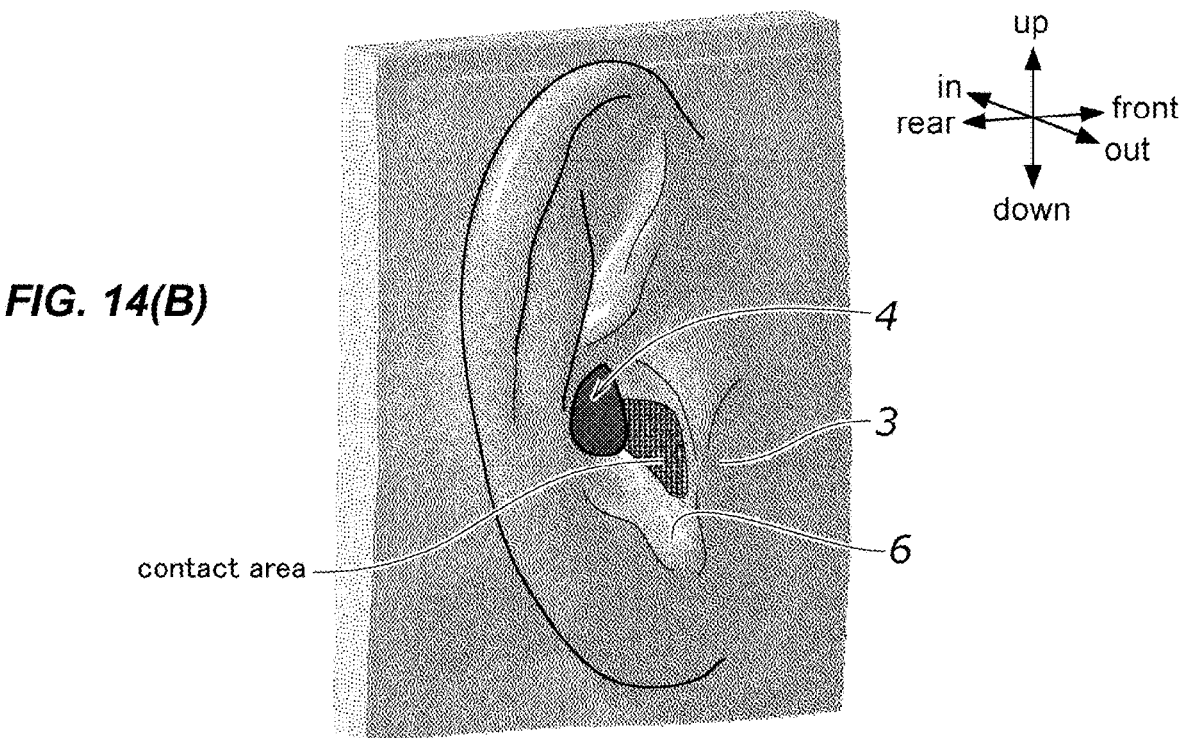
Figure 15:
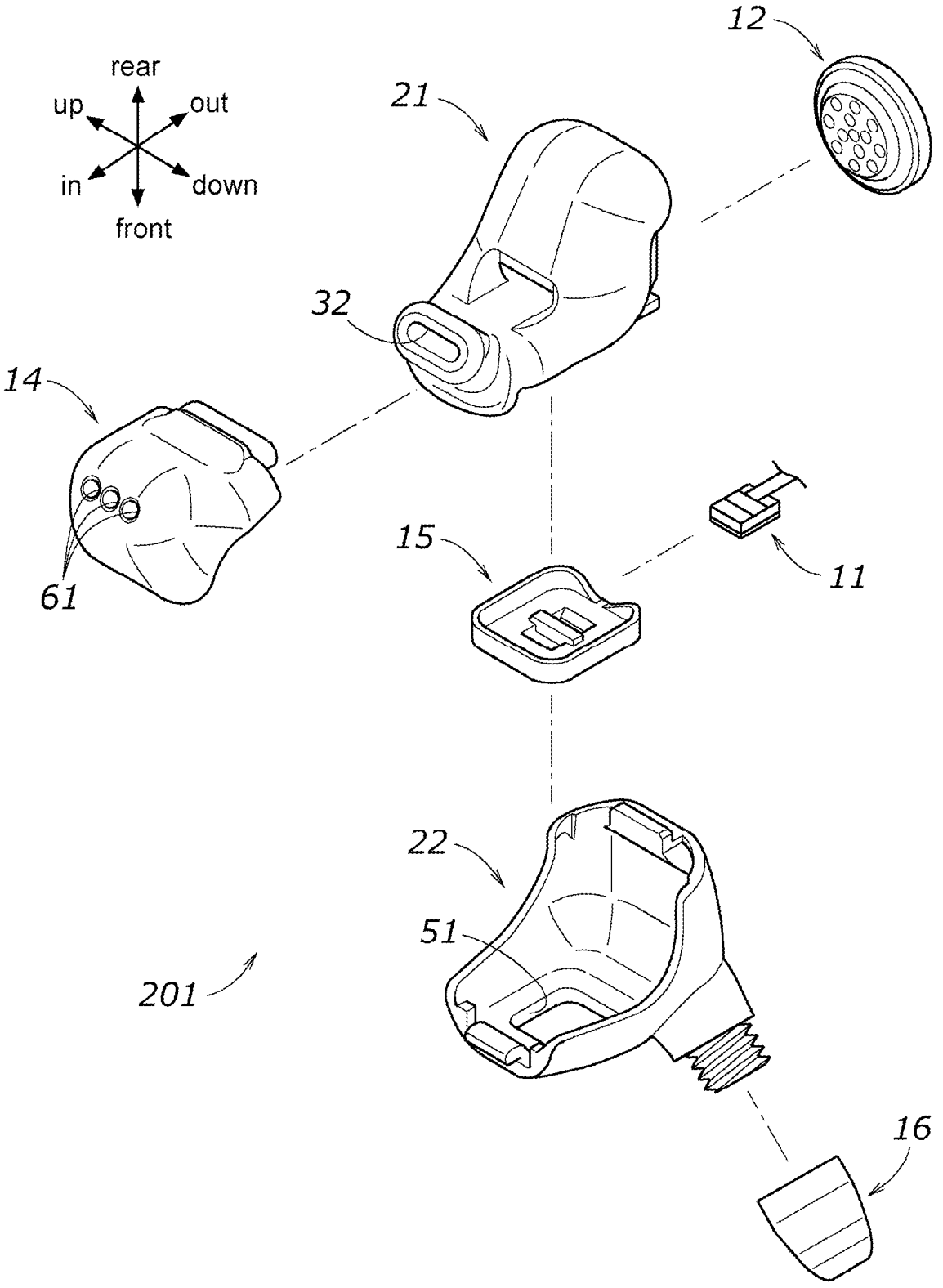
FIG. 15 is an exploded perspective view of the telephonic communication device of the third embodiment.
Figure 16:
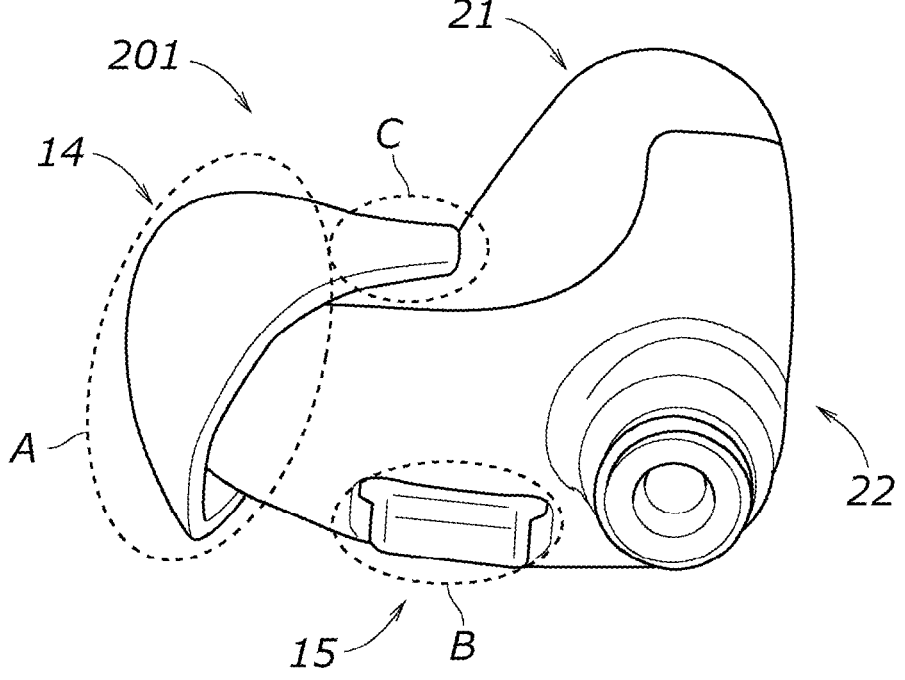
FIG. 16 is a perspective view of the telephonic communication device of the third embodiment.

Next, a second embodiment of the present disclosure will be described. FIGS. 14(A) and 14B are a perspective view of a telephonic communication device 201 according to the third embodiment, and FIG. 14(A) shows the telephonic communication device in use and FIG. 14(B) shows a contact area. FIG. 15 is an exploded perspective view of the telephonic communication device of the third embodiment. FIG. 16 is a perspective view of the telephonic communi-cation device of the third embodiment. Except for what will be discussed here, the third embodiment is the same as the first embodiment. In the description of the third embodi-ment, the features or elements having same functions as the first embodiment are denoted with same reference numerals without repeating the description thereof. A cable cap 16 (shown in FIG. 15) is omitted, i.e., not shown in FIGS. 14(A) and 16.

As shown in FIG. 14(A), the third embodiment of the telephonic communication device 201 is inserted into the user's ear 2 as in the first embodiment (FIG. 1). The microphone rubber 15 abuts against the tragus 3 from behind, as in the first embodiment. Specifically, as shown in FIG. 14(B), the microphone rubber 15 abuts against a surface on the rear side of the tragus 3.

As shown in FIG. 15, the telephonic communication device 201 uses a smaller bone conduction microphone 11 compared to the first embodiment (FIG. 5). This feature allows the microphone rubber 15 to abut against an inner surface of the ear closer to inside the ear canal 4.

The elastic members provided in the telephonic commu-nication device 201 carry out various functions (effects). The first function is to ensure a sealed state (airtightness). The second function is to properly follow the deformation of the ear canal 4. The third function is to ensure a proper pressing pressure applied to an ear canal surface for transmission of vibration to the bone conduction microphone 11.

In the present embodiment, as shown in FIG. 16, the tip rubber 14 and the microphone rubber 15 are provided as elastic members. The tip rubber 14 has a part A which performs the first function, and a part C that performs the third function. The part A contacts the ear canal 4 such that a contact area therebetween extends over the entire periphery to ensure a sealed state (airtightness). The part C, as the first elastic member, abuts against an ear canal wall opposite the tragus to ensure a pressing pressure for the bone conduction microphone 11. The microphone rubber 15 has a part B which performs the second function. The part B, as the second elastic member, abuts against the tragus and properly follows the change in the shape of the ear canal 4.

Next, variations of the third embodiment will be described. FIGS. 17(A) to 17(G) are perspective views of the telephonic communication device according to variations of the third embodiment. A cable cap 16 (shown in FIG. 15) is omitted, i.e., not shown in FIG. 17(A) to (G).

Figures 17A, 17B, 17C, 17D, 17E, 17F, 17G:
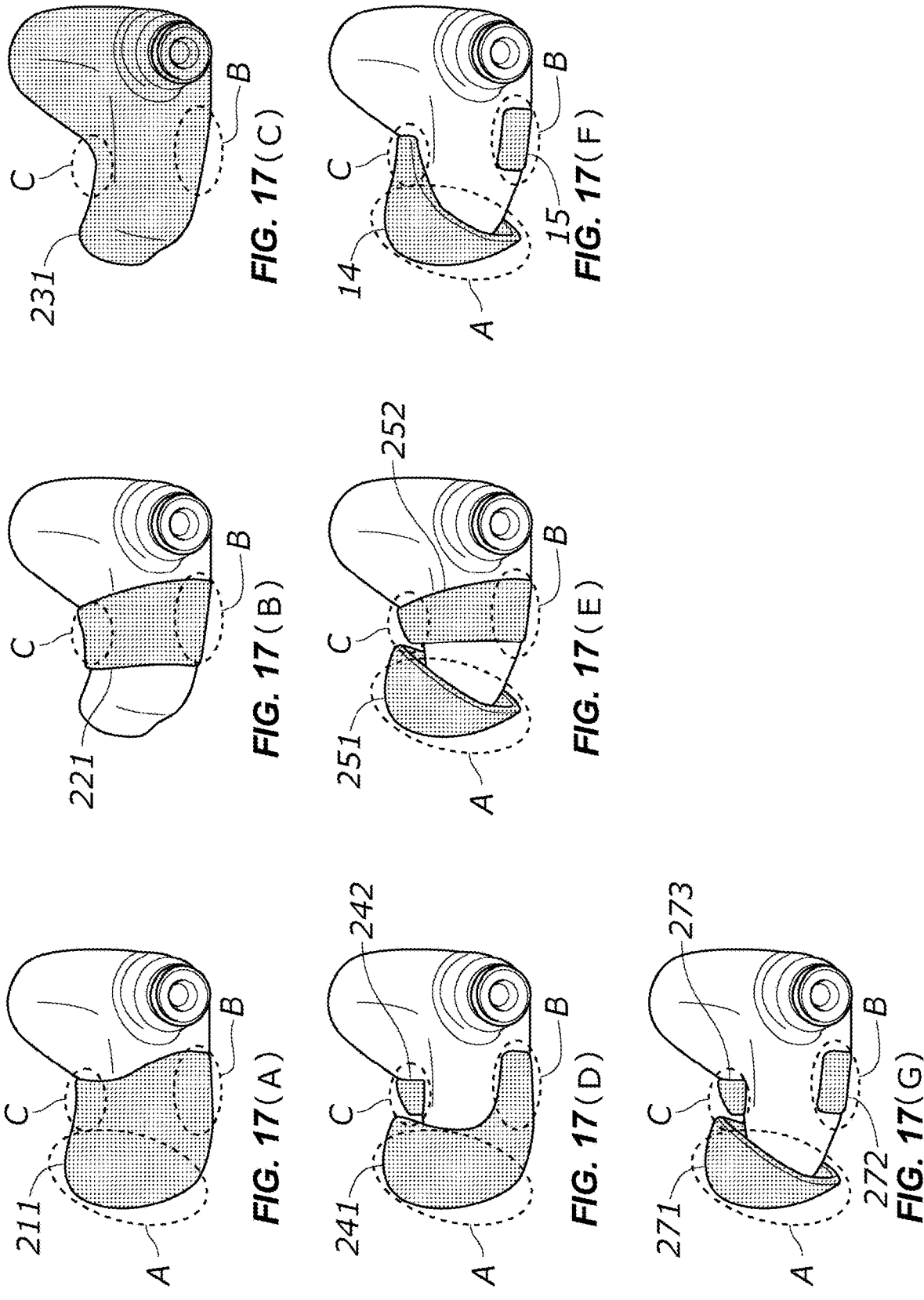
FIGS. 17(A) to 17(G) show perspective views of the telephonic communication device according to variations of the third embodiment.

The embodiments shown in FIGS. 17(A), 17(B), and 17(C) are devices having a one-piece configuration in which one rubber member is provided. The embodiment shown in FIG. 17(A) has a rubber 211. The rubber 211 has a part A, which performs the first function, a part B, which performs the second function, and a part C, which performs the third function. The embodiment shown in 17(B) has a rubber 221. The rubber 221 has a part B, which performs the second function, and a part C, which performs the third function. Since a part A, which performs the first function, is not present, and thus a sealed state (airtightness) is not ensured. The embodiment shown in FIG. 17(C) has a rubber 231. The rubber 231 has a part B, which performs the second function, and a part C, which performs the third function. Since a part A, which performs the first function, is not present, and thus a sealed state (airtightness) is not ensured. The rubber 231 may be part of the housing or may be configured to cover the entire rigid housing.

The embodiments shown in FIGS. 17(D), 17(E), and 17(F) are devices having a two-piece configuration in which two rubber members are provided. The embodiment shown in FIG. 17(D) has rubbers 241, 242. The rubber 241 has a part A, which performs the first function, a part B, which performs the second function. The rubber 242 has a part C, which performs the third function. The embodiment shown in 17(E) has rubbers 251, 252. The rubber 251 has a part A, which performs the first function. The rubber 252 has a part B, which performs the second function and a part C, which performs the third function. FIG. 17(F) shows the third embodiment (FIG. 16).

The embodiment shown in FIG. 17(G) are devices having a three-piece configuration in which three rubber members are provided. The embodiment shown in FIG. 17(G) has rubbers 271, 272, 273. The rubber 271 has a part A, which performs the first function. The rubber 272 has a part B, which performs the second function. The rubber 273 has a part C, which performs the third function.

In the embodiments shown in FIGS. 17(D), 17(F), and 17(G), the part C as the first elastic member is separate from the part B as the second elastic member. In the embodiments shown in FIGS. 17(A), 17(B), 17(C) and 17(E), the part C as the first elastic member is integrally formed with the part B as the second elastic member.

Any of the above-described variations of the third embodiment is similarly applicable to the other embodiments.

Fourth Embodiment

Figure 18A:
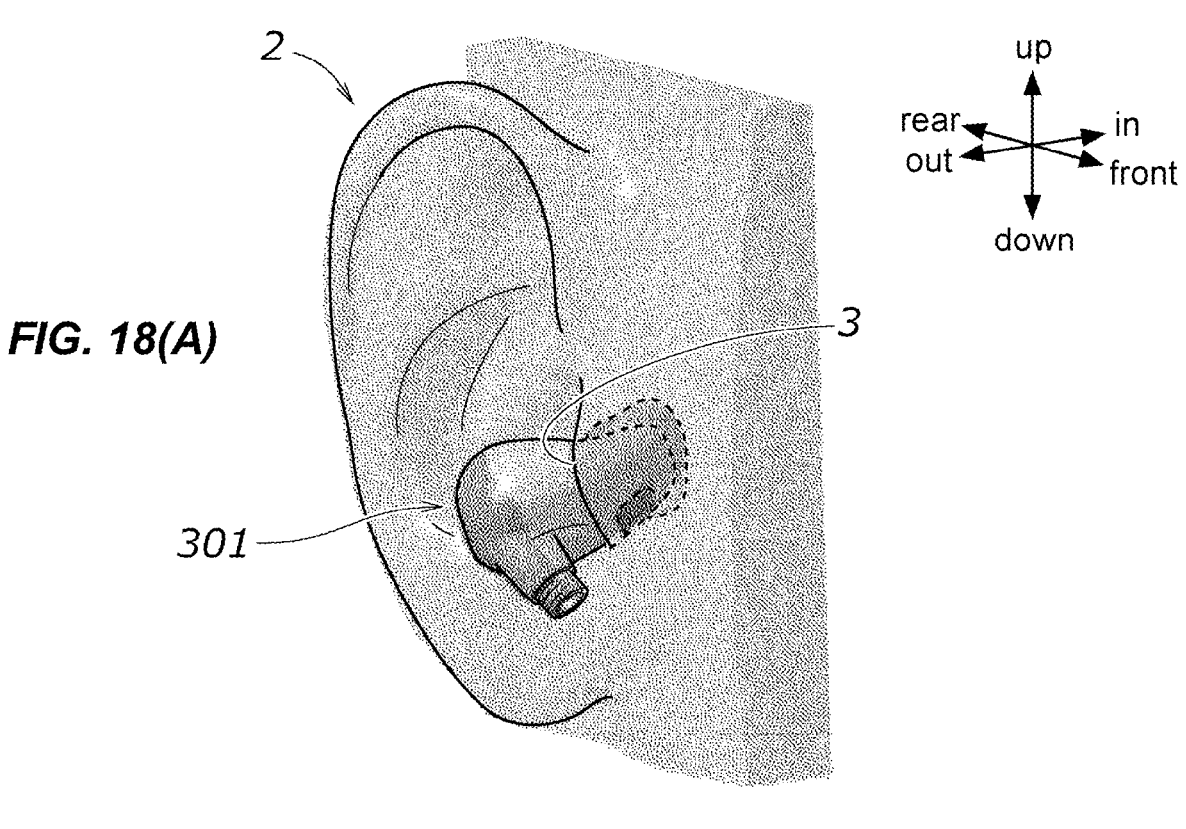
FIGS. 18(A) and 18(B) show perspective views of a telephonic communication device according to a fourth embodiment of the present disclosure.
Figure 18B:
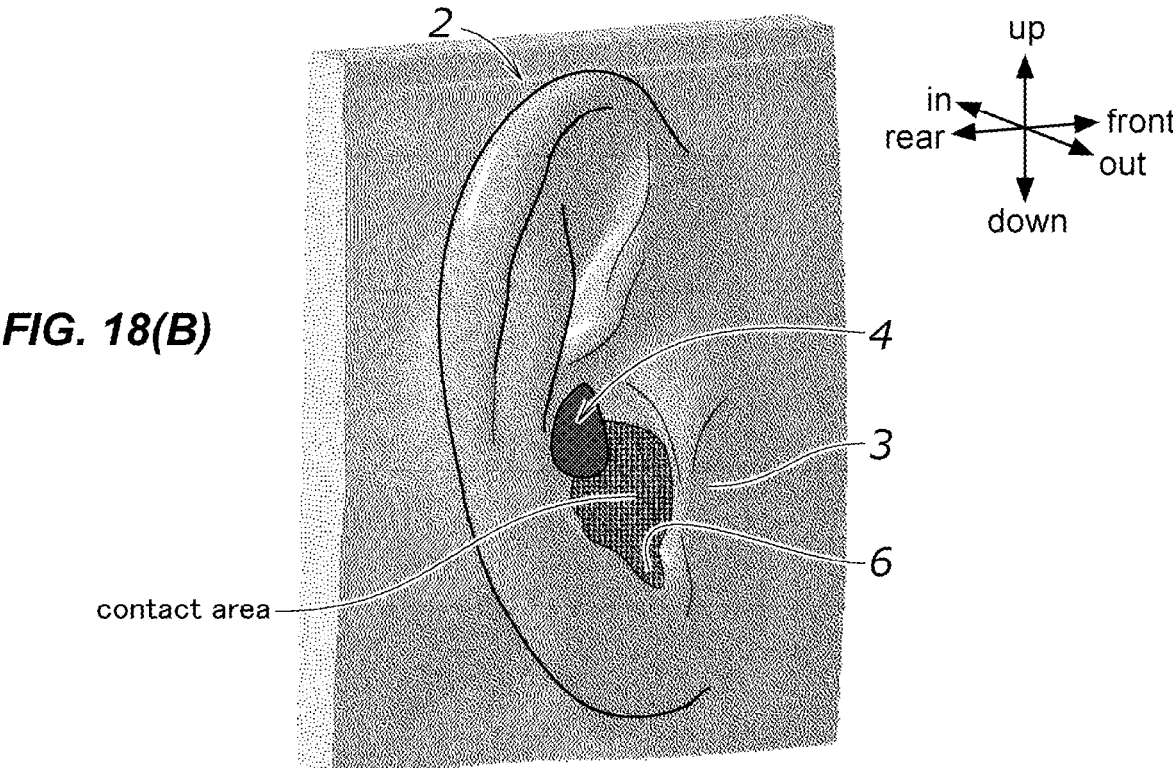
Figure 19:
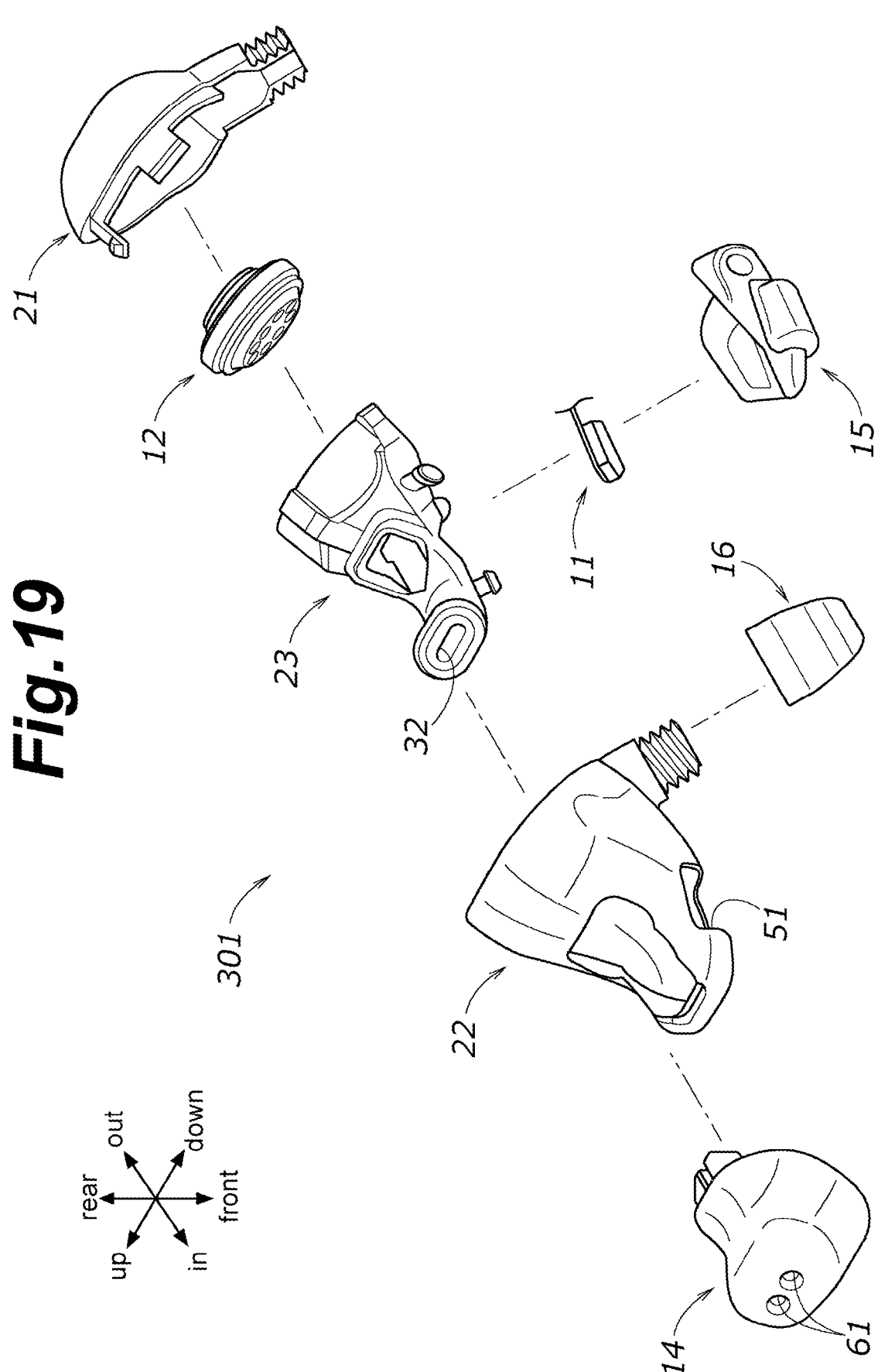
FIG. 19 is an exploded perspective view of the telephonic communication device of the fourth embodiment of the present disclosure.

Next, a fourth embodiment of the present disclosure will be described. FIGS. 18(A) and 18B are each a perspective view of a telephonic communication device 301 according to the fourth embodiment. FIG. 18(A) shows the telephonic communication device in use and FIG. 18(B) shows a contact area. FIG. 19 is an exploded perspective view of the telephonic communication device 301 of the fourth embodiment. In the description of the fourth embodiment, the features or elements having same functions as those of the above-described embodiments are denoted with same reference numerals without repeating the description thereof. A cable cap 16 (shown in FIG. 19) is omitted, i.e., not shown in FIG. 18(A).

As shown in FIG. 18(A), the telephonic communication device 301 of the fourth embodiment is adapted to be inserted into a user's ear 2 as in the first embodiment (FIG. 1). The microphone rubber 15 abuts against an area around the tragus 3 from behind and to diagonally downward. In other words, as shown in FIG. 18(B), the microphone rubber 15 abuts against a surface around the tragus 3. Specifically, the microphone rubber 15 comes into contact with an area extending from the tragus 3 to the intertragic notch 6. The contact area between the microphone rubber 15 and an ear surface is enlarged toward the intertragic notch 6 compared to the third embodiment (FIG. 14(B)).

As shown in FIG. 19, the telephonic communication device 301, as in the third embodiment (FIG. 15), uses a smaller bone conduction microphone 11 compared to the first embodiment (FIG. 5). This feature allows the microphone rubber 15 to abut against an area of the ear closer to inside the ear canal 4.

As shown in FIG. 2, a part of the ear 2 extending from the concha auriculae 7 to an ear canal wall 5 is curved in a U shape. Thus, the telephonic communication device 1 of the first embodiment has an outer shape that conforms to the shape of the part from the concha auriculae 7 to the ear canal wall 5. This feature of the outer shape is included in the telephonic communication device 201 of the third embodiment and the telephonic communication device 301 of the present embodiment. This feature of the outer shape allows a user to use the telephonic communication device 1, 201, and 301 without feeling uncomfortable when wearing the device correctly.

However, the telephonic communication device 301 of the present embodiment differs from the telephonic communication device 1 of the first embodiment (FIG. 5) and the telephonic communication device 201 (FIG. 15) in the locations of the bone conduction microphone 11 and the microphone rubber 15.

Specifically, in the telephonic communication device 1 (FIG. 5) of the first embodiment and the telephonic communication device 201 (FIG. 15) of the third embodiment, the bone conduction microphone 11 and the microphone rubber 15 are arranged such that the microphone rubber 15 is located at the front of the bone conduction microphone 11, surrounded by the tip rubber 14, the case 21, and the cover 22. This arrangement allows the microphone rubber 15 to abut against the tragus 3 when the device is worn correctly without causing a user to feel uncomfortable.

In the telephonic communication device 301 of the present embodiment as shown in FIG. 19, the bone conduction microphone 11 and the microphone rubber 15 are arranged such that the microphone rubber 15 is located at the lower front of the bone conduction microphone 11, surrounded by the tip rubber 14, the case 21, and the cover 22. This arrangement allows the microphone rubber 15 to come into contact with the area extending from the tragus 3 to the intertragic notch 6 when the device is worn correctly without causing a user to feel uncomfortable.

Thus, in the present embodiment, the microphone rubber 15 comes into contact with the area extending from the tragus 3 to the intertragic notch 6. This configuration allows the bone conduction microphone 11 to be positioned in the proper orientation with respect to the transmission of vocal cord vibration, thereby improving the efficiency of sound collection, which allows for an increase and stabilization of the sound collection level of the bone conduction microphone 11.

While specific embodiments of the present disclosure are described herein for illustrative purposes, the present disclosure is not limited to those specific embodiments. Various changes, substitutions, additions, and omissions may be made to elements of the embodiments without departing from the scope of the disclosure. Moreover, elements and features of the different embodiments may be combined with each other to yield another embodiment of the present disclosure. Examples of telephonic communication devices of the present disclosure include wired headsets, wireless headsets such as Bluetooth (registered trademark), full wireless headsets, transceivers, intercoms, and head-mounted displays. Use of the telephonic communication device of the present disclosure is not limited to telephonic communication. The telephonic communication device of the present disclosure may also be used for voice recognition and voice recorders (audio recording).

INDUSTRIAL APPLICABILITY

A telephonic communication device according to the present disclosure ensures a secure and stable contact between the bone conduction microphone and a vocal cord vibration transmission part of a user's ear irrespective of individual difference in shape of the ear. In addition, the bone conduction microphone prevents generation of abnormal noise by the user's action (e.g. user's utterance), and also prevents the microphone from picking up such abnormal noise. Such a telephonic communication device of the present disclosure is useful as a telephonic communication device comprising a microphone and receiver and configured to be worn on a user's head, and in particular, a telephonic communication device comprising a housing that houses and contains a bone conduction microphone and an air conduction receiver therein, and is adapted to be inserted into a user's ear.

GLOSSARY

1, 101, 201, 301 telephonic communication device
2 ear
3 tragus
4 ear canal
5 ear canal wall
6 intertragic notch
7 concha auriculae
11, 111 bone conduction microphone
12, 112 air conduction receiver
13, 113 housing
14, 81, 114 tip rubber (first elastic member)
15, 115 microphone rubber (second elastic member)
32 passageway portion
41 microphone receiving portion
42 abutting surface

14

43 first wall portion
44 second wall portion
45 flange
51 opening
61 through hole
91 interposed rubber (third elastic member)

The invention claimed is:

1. A telephonic communication device comprising:
a bone conduction microphone that picks up a user's utterance;
an air conduction receiver that reproduces a received voice of a partner that is a person at another end of communication;
a housing that houses the bone conduction microphone and the air conduction receiver; and
first and second elastic members attached to the housing,
wherein the housing has an opening facing the user's tragus,
wherein the first elastic member is formed to abut against at least an ear canal wall opposite the tragus,
wherein the second elastic member is elastically supported by a peripheral edge of the opening while holding the bone conduction microphone, and
wherein the second elastic member includes a protruding portion that protrudes from the opening, the protruding portion having an abutting surface that abuts against a surface on or around the tragus.

2. The telephonic communication device as claimed in claim 1, wherein the second elastic member includes a microphone receiving portion in a shape of a pouch that receives and surrounds the bone conduction microphone, and wherein the microphone receiving portion includes a wall portion on which the abutting surface is formed.

3. The telephonic communication device as claimed in claim 1, wherein the second elastic member includes a flange circumferentially extending on an outer side surface thereof, and the flange is fixedly mounted onto the peripheral edge of the opening.

4. The telephonic communication device as claimed in claim 1, wherein the housing has a passageway portion for directing reproduced sound from the air conduction receiver,
wherein the air conduction receiver is disposed at one end of the passageway portion, and
wherein the first elastic member is disposed at the other end of the passageway portion and has a through hole for further directing the reproduced sound that travels through the passageway portion to inside the ear canal.

5. The telephonic communication device as claimed in claim 1, wherein the abutting surface of the second elastic member is formed in either a curved bulging shape or a flat shape.

6. The telephonic communication device as claimed in claim 1, wherein the abutting surface of the second elastic member is formed in one of an upward slope shape toward inside the ear canal, a flat shape, or a downward slope shape toward inside the ear canal.

7. The telephonic communication device as claimed in claim 1, wherein the first elastic member is formed in either a solid or hollow structure.

8. The telephonic communication device as claimed in claim 1, further comprising a third elastic member provided between the housing and a surface of the second elastic member opposite the abutting surface thereof.

9. The telephonic communication device as claimed in claim 1, wherein the first elastic member is integrally formed with the second elastic member.

\* \* \* \* \*